(12) United States Patent
Nakazono et al.

(10) Patent No.: US 8,147,288 B2
(45) Date of Patent: Apr. 3, 2012

(54) METHOD FOR ALIGNING FILM SHEETS AND RECTANGULAR PANELS IN DISPLAY PANEL MANUFACTURING SYSTEM

(75) Inventors: Takuya Nakazono, Osaka (JP); Kazuo Kitada, Osaka (JP); Tomokazu Yura, Osaka (JP); Satoru Koshio, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/102,508

(22) Filed: May 6, 2011

(65) Prior Publication Data

US 2011/0306263 A1    Dec. 15, 2011

Related U.S. Application Data

(63) Continuation of application No. PCT/JP2010/059808, filed on Jun. 10, 2010.

(51) Int. Cl.
*H01J 9/00* (2006.01)
(52) U.S. Cl. .......... 445/24; 349/191; 349/192; 349/187; 156/60; 156/64; 156/378
(58) Field of Classification Search .................. 445/24; 349/187–192; 156/60, 64, 378
See application file for complete search history.

(56) References Cited

U.S. PATENT DOCUMENTS

| 6,278,398 | B1  | 8/2001  | Vossiek et al.        |
|-----------|-----|---------|-----------------------|
| 6,867,841 | B2* | 3/2005  | Nakasu et al. ... 349/187 |
| 7,129,124 | B2  | 10/2006 | Hongo et al.          |
| 2004/0041158 | A1 | 3/2004 | Hongo et al.          |
| 2007/0041410 | A1 | 2/2007 | Hongo et al.          |
| 2010/0283943 | A1 | 11/2010 | Kimura et al.         |
| 2010/0288420 | A1 | 11/2010 | Kimura et al.         |
| 2010/0316817 | A1 | 12/2010 | Kimura et al.         |

FOREIGN PATENT DOCUMENTS

| JP | 19980537174 | 11/2001 |
| JP | 2002-23151  | 1/2002  |
| JP | 2003-062912 | 3/2003  |
| JP | 2004-205530 | 7/2004  |

(Continued)

OTHER PUBLICATIONS

Korean Decision on Grant for 10-2010-7029739 dated Jul. 6, 2011.
Taiwanese Decision to Grant for application No. 099146321 dated Nov. 14, 2011.
International Search Report in Japanese mailed Aug. 17, 2010, for PCT/JP2010/059808.

(Continued)

*Primary Examiner* — Mariceli Santiago
(74) *Attorney, Agent, or Firm* — Lowe Hauptman Ham & Berner, LLP

(57) ABSTRACT

A method for aligning film sheets and rectangular panels in a continuous manufacturing system of display panels, each of the film sheets being formed between two longitudinally adjacent slit lines, one on an upstream side and the other on a downstream side, and extending in a transverse direction with respect to a feeding direction of a strip shaped film laminate, such that the rectangular panels conveyed to the lamination position are overlapped with the film sheets conveyed to the lamination position. The method includes steps of; angularly adjusting the rectangular panel conveyed to the lamination position such that a center line extending in the feeding direction of the rectangular panels is parallel to the center line extending in the feeding direction of the film sheets conveyed to the lamination position; and position adjusting the angularly adjusted rectangular panels by shifting for a displacement from a position of the film sheets conveyed to the lamination position.

9 Claims, 21 Drawing Sheets

FOREIGN PATENT DOCUMENTS

| | | |
|---|---|---|
| JP | 2004-361741 | 12/2004 |
| JP | 4377964 | 12/2009 |
| JP | 2010-113109 | 5/2010 |
| TW | 200415536 | 2/2006 |

OTHER PUBLICATIONS

Written Opinion of The International Searching Authority mailed Aug. 17, 2010, for PCT/JP2010/059808.

* cited by examiner

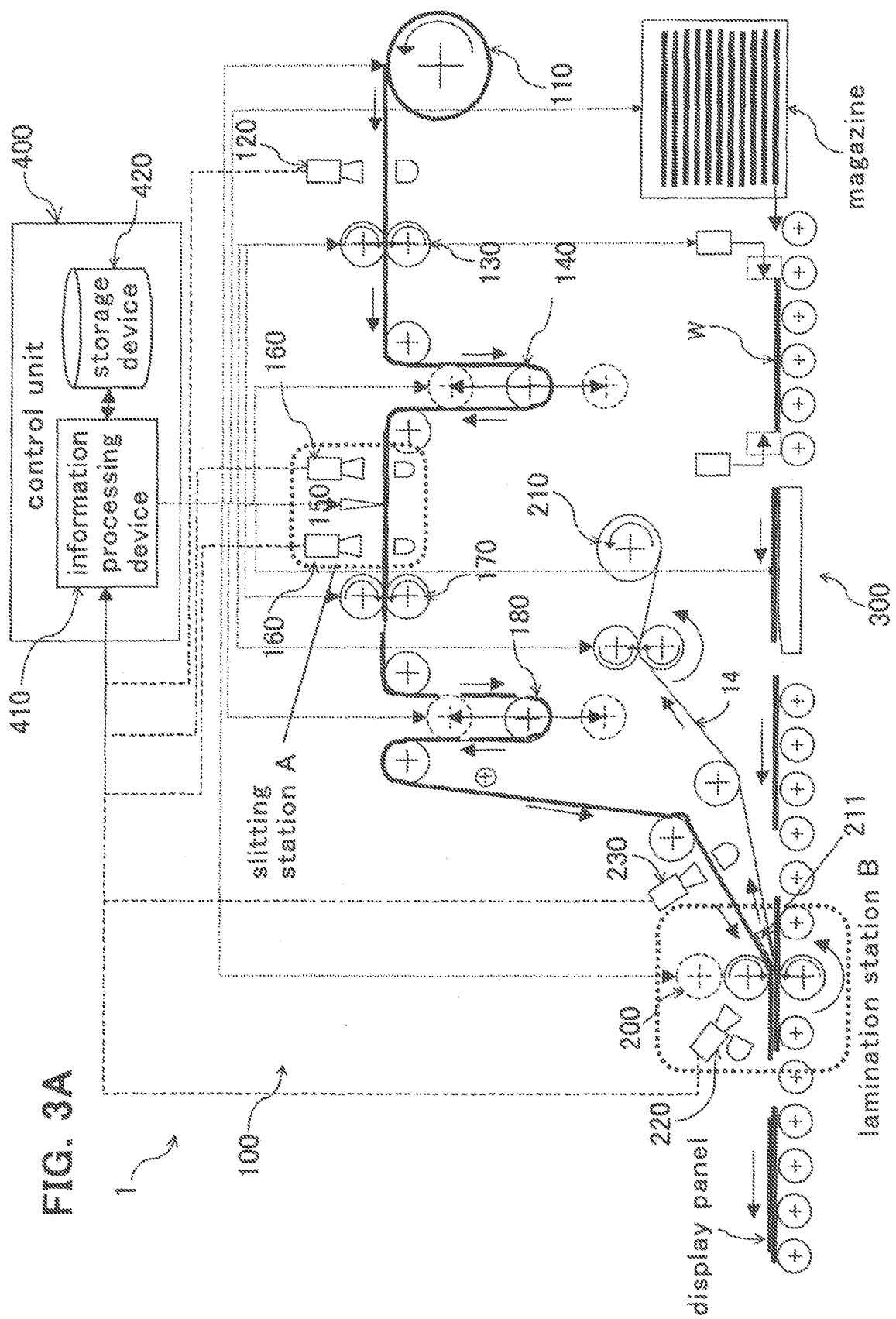

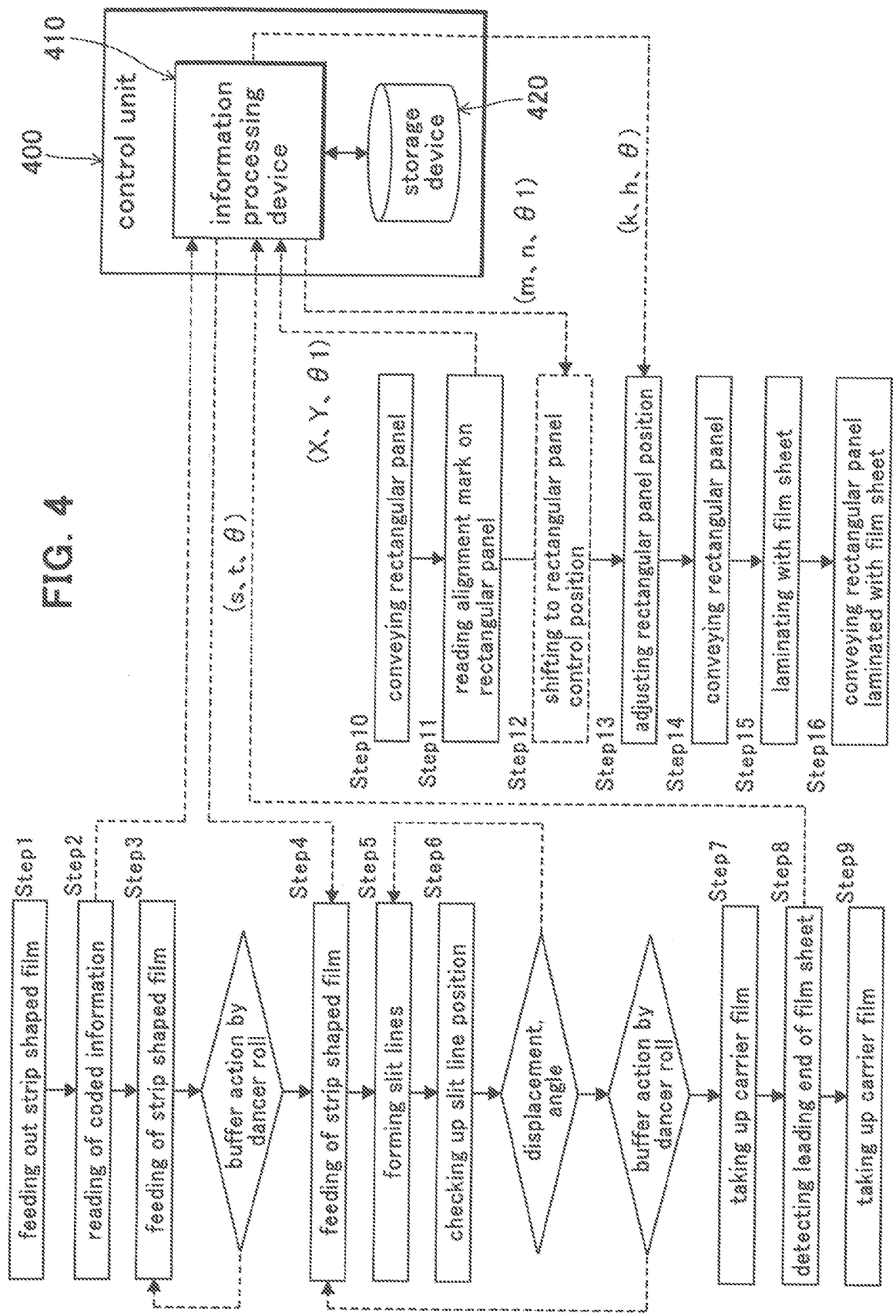

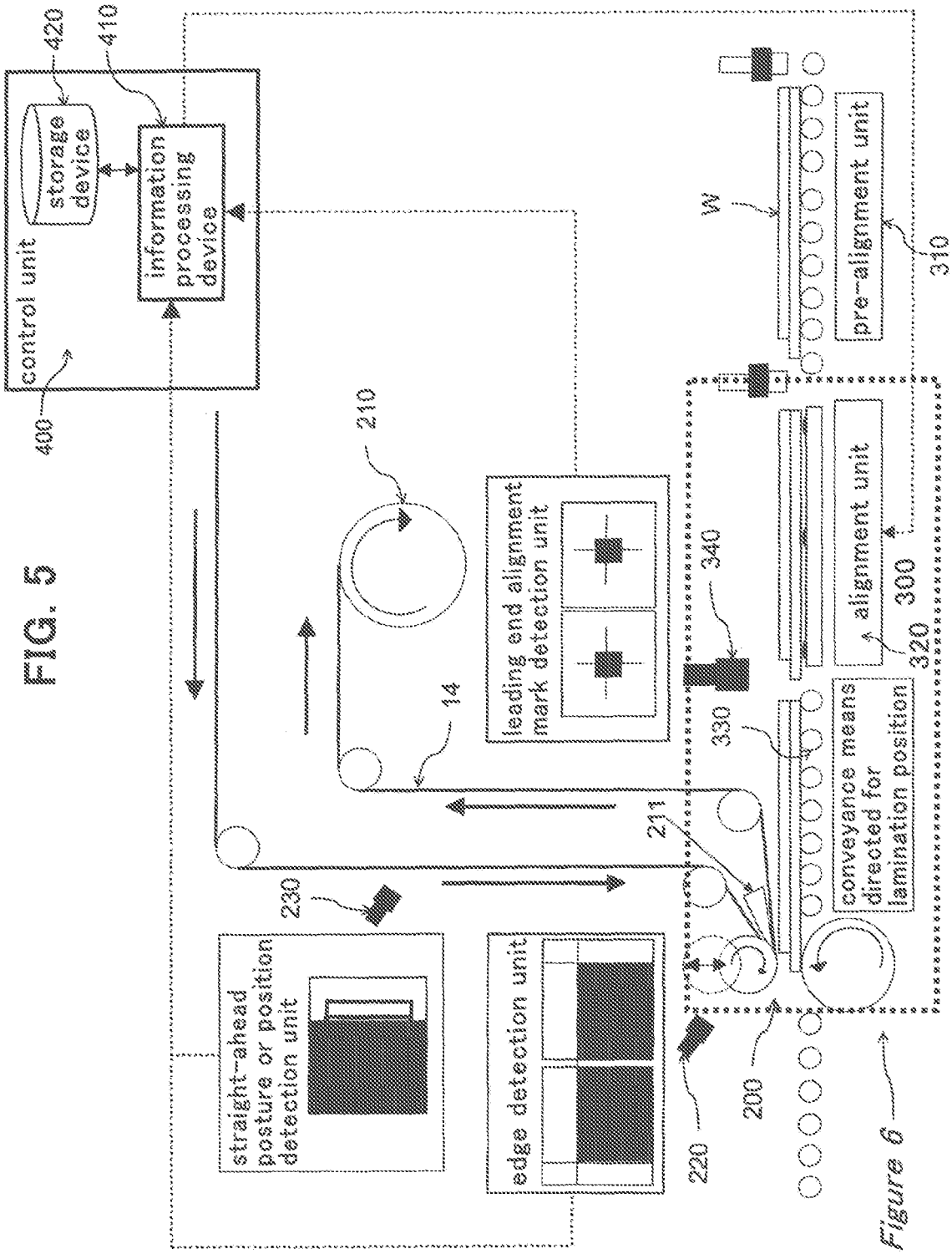

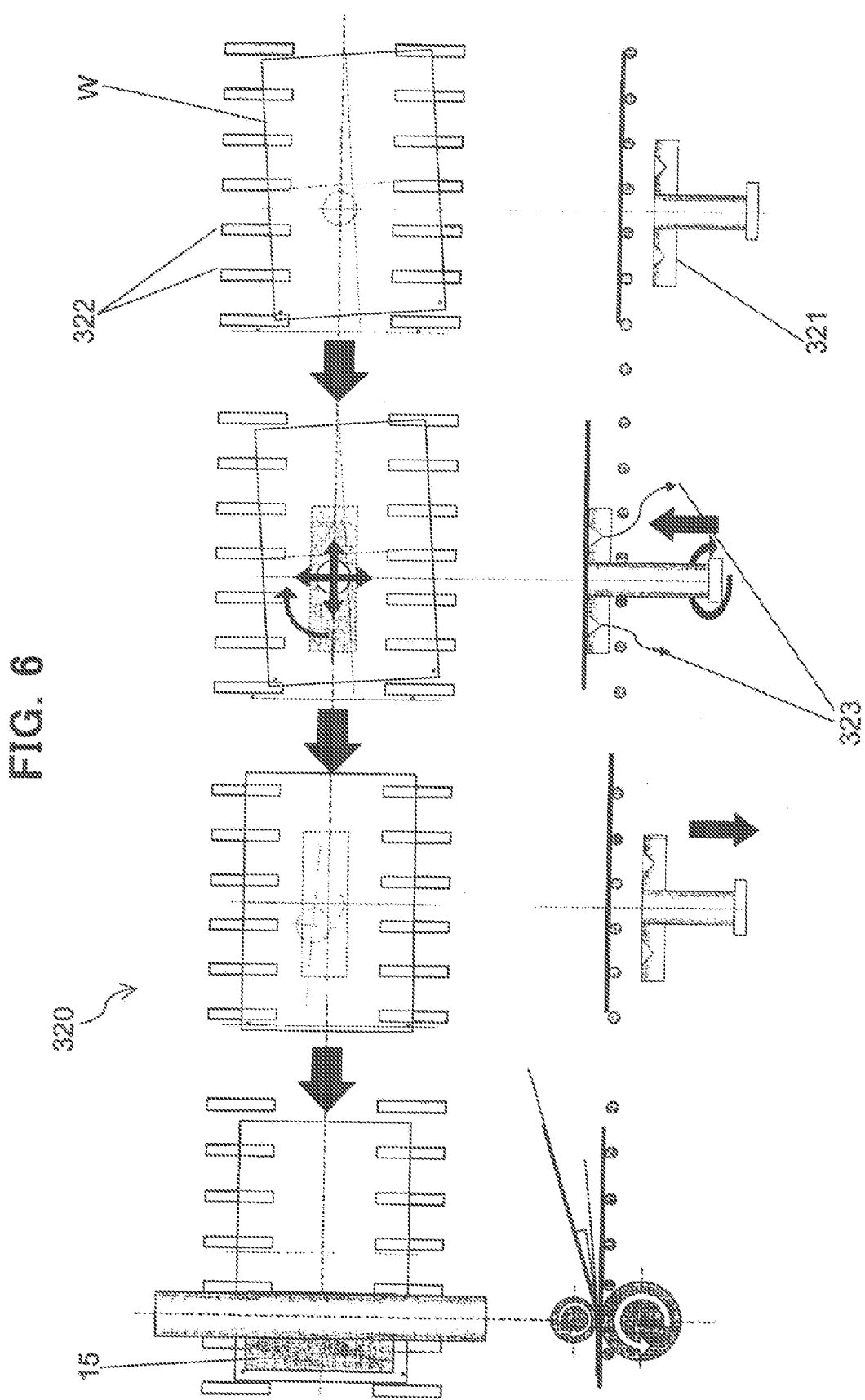

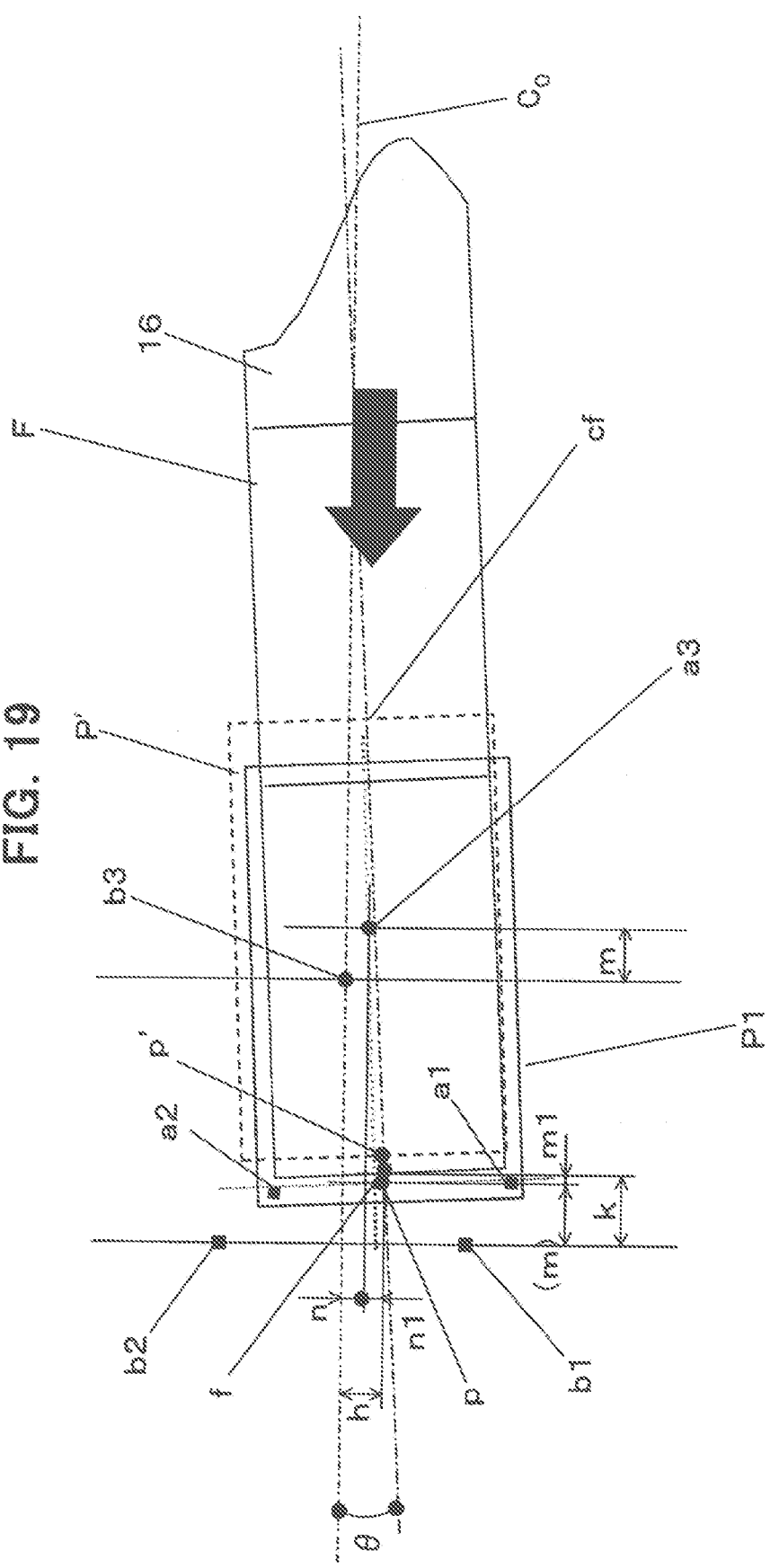

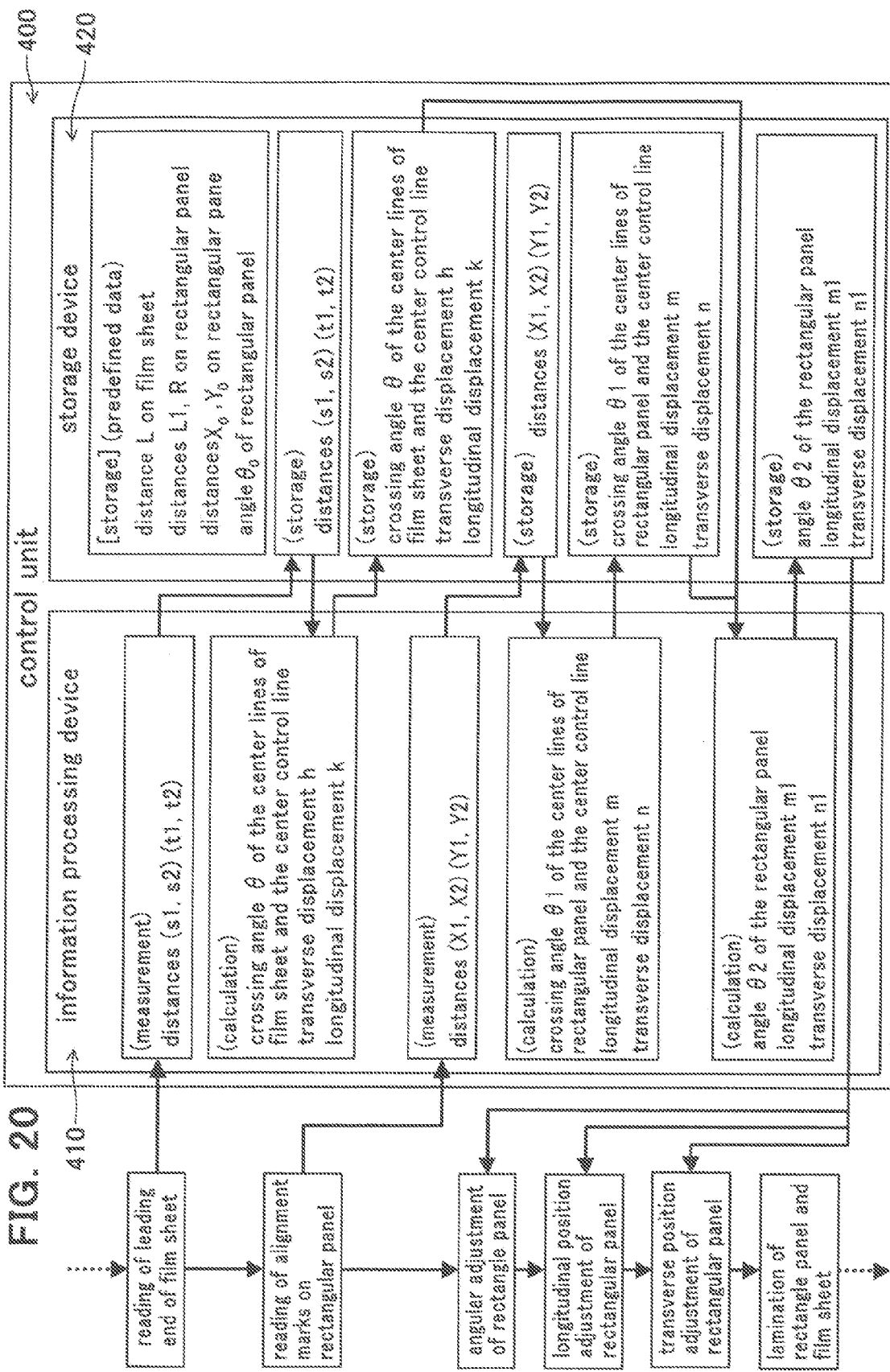

METHOD FOR ALIGNING FILM SHEETS
AND RECTANGULAR PANELS IN DISPLAY
PANEL MANUFACTURING SYSTEM

CROSS REFERENCE TO RELATED
APPLICATION

Related Applications

The present application is a continuation of International Application Number PCT/JP2010/059808 filed Jun. 10, 2010, the disclosure of which is hereby incorporated by reference herein in their entirety.

TECHNICAL FIELD

The present invention relates to a method for aligning film sheets and rectangular panels in a system for continuously manufacturing display panels by laminating or attaching film sheets to rectangular panels. More particularly, the present invention relates to a method for aligning film sheets with rectangular panels in a system for continuously manufacturing display panels, wherein the film sheets are formed on a continuous web of a film laminate each between two longitudinally adjacent transversely extending slit lines one at an upstream side and the other at a downstream side as seen in feeding direction of the web, the sheets being conveyed as an integral unit with the web of film laminate to a lamination or attachment position for lamination or attachment to the rectangular panels, then peeled from the web of film laminate, and sequentially attached to the rectangular panels conveyed in synchronization with the film sheets.

BACKGROUND ART

A conventional manufacturing system of display panels is designed to use rectangular film sheets which are preliminarily cut in a separate process and transported in the form of a package to a manufacturing line of display panels. As disclosed in the Japanese Laid-Open Patent Publication 2002-23151A, such rectangular film sheets are produced in a film sheet manufacturing apparatus by being punched out or cut from a continuous web of film laminate including a polarizing film. Herein, these film sheets are collectively referred as "individualized film sheets." A plurality of such individualized film sheets are brought into the display panel manufacturing line. The individualized film sheets thus brought into the manufacturing line are stored in a magazine provided for storing the individualized film sheets. Each of the individualized film sheets generally comprises an adhesive layer applied to the film sheet and a peelable film for protecting an exposed surface of the adhesive layer.

The magazine storing the individualized film sheets is incorporated in the display panel manufacturing line. The rectangular panels are taken out one-by-one from a magazine storing rectangular panels, which is similarly incorporated in the manufacturing line. The individualized film sheets are taken out from the magazine one-by-one typically by means of a suction type conveyance unit in synchronization with the rectangular panels. The peelable film is peeled from each of the taken out individualized film sheets to have the adhesive layer of the film sheet exposed. The individualized film sheets with the adhesive layers in the exposed state are conveyed under suction to the lamination or attachment position for lamination or attachment to the rectangular panels. Aligning the individualized film sheets respectively with the rectangular panels is generally performed by conveying the individualized film sheets to respective one side surfaces of the respective rectangular panels.

In contrast to the display panel manufacturing system using such individualized film sheets, the Japanese Patent No. 4371709B discloses a display panel manufacturing system wherein film sheets having substantially the same length as the rectangular panels are formed on a peelable film, the peelable film being then moved to convey the film sheets to the lamination or attachment position for lamination with the rectangular panels, the film sheets being then adjusted for alignment and laminated with the rectangular panels. More particularly, there is disclosed a display panel manufacturing system wherein film sheets are formed on a continuous web of a continuous strip shaped film laminate which is taken out from a roll of a strip shaped film laminate provided in the display panel manufacturing system, and conveyed to a lamination position for lamination with rectangular panels, the film laminate having a width which is substantially the same as that of the rectangular panel, the film sheets being formed by providing the continuous web with transversely extending, longitudinally spaced slit lines and attached to the rectangular panels. The manner of aligning the film sheets with the rectangular panels is such that a rectangular panel conveyed to the lamination position is positioned at its end face, in accordance with information of detected position of the leading edge of a film sheet, so that the end face of the rectangular panel is aligned with a corresponding end face of the film sheet.

The Japanese Patent No. 4377964B notices that it is difficult to accurately feed a continuous web of a strip shaped film laminate such that an angle θ of the web with respect to the feeding direction becomes θ=0, and based on such understanding, proposes a continuous manufacturing system of display panels including a lamination unit for laminating together film sheets and rectangular panels both conveyed in synchronization. According to the lamination method in this system, an image of at least an edge or both edges of film sheets formed by slit lines on a carrier film conveyed to the lamination position is taken by such as a CCD camera to be visualized. Then, displacements in a feeding direction, a transverse direction and an angle are measured by comparing them with those of a case where film sheets are conveyed with θ=0. The measured displacements are represented in terms of x, y and θ values and the rectangular panels conveyed to the lamination position are checked in orientations with the x, y and θ values for adjustment of misalignment. However, it has not been specifically described how to check the rectangular panels with the measured values of the film sheets represented by x, y and θ or how to align film sheets with the rectangular panels.

The prior art documents referred to in the above descriptions are listed below.

Patent Document 1: Japanese Laid-Open Patent Publication 2002-23151A
Patent Document 2: Japanese Pat. No. 4371709B
Patent Document 3: Japanese Pat. No. 4377964B

DISCLOSURE OF THE INVENTION

Problem to be Solved by the Invention

At present, as shown in FIG. 2, a display panels is composed of either one of respective combinations of: identically shaped rectangular panel and film sheet with center lines extending in a feeding direction being aligned with each other; or a rectangular panel and a film sheet with center lines extending in a feeding direction being aligned each other but leaving non-overlapping marginal edge portion or portions left along four sides or at a part of the sides; or, a rectangular panel and a film sheet with center lines extending in a feeding direction being located in parallel with each other and leaving non-overlapping marginal edge portion or portions left along four sides or at a part of the sides. Allowable displacement in a feeding direction and/or a transverse direction for laminating the rectangular panel and the film sheet composed of either one of the above combination is about 0.5 to 1 mm. This means that a film sheet and a rectangular panel are required to be accurately aligned not only at their leading ends but also in all four sides during a little interrupting time, i.e., at least within 4 to 5 seconds, at the lamination position in the continuous manufacturing system of display panels. The required aligning accuracy specifically is better than the order of 1/500 to 1/1,000.

As will be described later, the present invention aims at providing a method for aligning film sheets and rectangular panels in a continuous manufacturing system of display panels, the manufacturing system being configured such that film sheets are formed in a strip shaped film laminate having a width which is the same as the length of the short sides of the rectangular panels or a width which is of a size wherein marginal edge portions are left along the short sides of the rectangular panels between respective two longitudinally adjacent slit lines extending transversely with respect to the feeding direction of the film laminate, the film sheet having a length identical with the longer sides of the rectangular panels or a length wherein marginal edge portions are left at the leading and trailing end portions of the longer sides of the rectangular panels, the film sheets being transported as an integral unit with the strip shaped film laminate to the lamination position with respect to a plurality of sequentially conveyed rectangular panels, the film sheets being peeled from the strip shaped film laminate, the peeled film sheets being then laminated with the rectangular panels conveyed to the lamination position in synchronization with the film sheets.

Means for Solving the Problem

The above technical problems can be solved by a method comprising at least the following steps of; first determining a center line extending in a feeding direction in each of identically shaped rectangular panels and film sheets sequentially conveyed to a lamination position, or, in each of rectangular panels and film sheets having different outer dimensions so that non-overlapping marginal edge portion is left along four sides or along a portion or portions of sides of the rectangular panel, and angularly adjusting the rectangular panel such that the determined center line of the rectangular panel is in parallel with that of the film sheet; and adjusting in position the angularly adjusted rectangular panel by shifting the rectangular panel by a distance corresponding to a displacement of the panel from the position of the film sheet conveyed to the lamination position.

The invention defined by claim 1 is a method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner; the method comprising steps of; angularly adjusting the rectangular panel conveyed to the lamination position such that the center line extending in the feeding direction of the rectangular panels is in parallel with the center line extending in the feeding direction of the film sheets conveyed to the lamination position; and positionally adjusting the angularly adjusted rectangular panels by shifting each of the panels by a distance corresponding to a displacement of each panel from the position of the corresponding film sheet conveyed to the lamination position.

The invention defined by claim 2 includes, in addition to the features of the invention defined by claim 1, a step of positionally adjusting the rectangular panel conveyed to the lamination position such that the center line of the rectangular panel is transversely aligned with the center line of the film sheet conveyed to the lamination position, whereby the rectangular panel conveyed to the lamination position is laid over the film sheets conveyed to the lamination position with marginal edge portions of a predetermined width left to extend along the feed direction and/or along the transverse direction.

The invention defined by claim 3 includes, in addition to the features of the invention defined by claim 1, a step of positionally adjusting the rectangular panel conveyed to the lamination position such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

The invention defined by claim 4 is a method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner; the method comprising steps of; (1) determining an amount of displacement of the position of the film sheet conveyed to the lamination position from a film sheet reference position, said film sheet reference position being determined in advance at the lamination position for positioning the film sheet when the film sheet is located on a center reference line indicating a direction along which the film sheets and the rectangular panels are to be conveyed; (2) determining an angle of the center line extending in the feeding direction of the film sheet conveyed to the lamination position with respect to the center reference line; (3) determining an amount of displacement of the position of the rectangular panel conveyed to the lamination position from a rectangular panel reference position, said rectangular panel reference position being also determined in advance at the lamination position for positioning the rectangular panel when the rectangular panel is positioned on the center reference line; (4) determining an angle of the center line extending in a feeding direction of the rectangular panel conveyed to the lamination position with respect to the center reference line; (5) angularly adjusting the rectangular panel conveyed to the lamination position such that the center line of the rectangular panel is oriented in parallel with the center reference line; (6) shifting the angularly adjusted rectangular panel by a distance corresponding to the amount of the displacement from the rectangular panel reference position; (7) further angularly adjusting the rectangular panel of which position is corrected to the rectangular panel reference position, such that the center line of the rectangular panel is oriented in parallel with the center line of the film sheet conveyed to the lamination position; and (8) shifting the further angularly adjusted rectangular panel by a distance corresponding to the amount of the displacement of the position of the film sheet conveyed to the lamination position from the film sheet reference position.

The invention defined by claim 5 includes, in addition to the features of the invention defined by claim 4, steps of positionally adjusting the rectangular panel, conveyed to the lamination position such that the center line of the rectangular panel is transversely aligned with the center line of the film sheet conveyed to the lamination position whereby the rectangular panel conveyed to the lamination position is laid over the film sheet conveyed to the lamination position with marginal edge portions of a predetermined width left to extend along the feed direction and/or along the transverse direction.

The invention defined by claim 6 includes, in addition to the features of the invention defined by claim 4, steps of positionally adjusting the rectangular panel conveyed to the lamination position such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

The invention defined by claim 7 is a method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner; the method comprising steps of: (1) determining an amount of displacement of the position of the film sheet conveyed to the lamination position from a film sheet reference position, said film sheet reference position being determined in advance at the lamination position for positioning the film sheet when the film sheet is located on a center reference line indicating a direction along which the film sheets and the rectangular panels are to be conveyed; (2) determining an angle of the center line extending in the feeding direction of the film sheet conveyed to the lamination position with respect to the center reference line; (3) determining an amount of displacement of the position of the rectangular panel conveyed to the lamination position from a rectangular panel reference position, said rectangular panel reference position being also determined in advance at the lamination position for positioning the rectangular panel when the rectangular panel is positioned on the center reference line; (4) determining an angle of the center line extending in a feeding direction of the rectangular panel conveyed to the lamination position with respect to the center reference line; (5) angularly adjusting the rectangular panel conveyed to the lamination position based on the angles determined in the steps (2) and (4) such that the center line of the rectangular panel is oriented in parallel with the center reference line; (6) then shifting the angularly adjusted rectangular panel based on the amounts of displacements determined in the steps (1) and (3) by a distance corresponding to the amounts of the displacements from the position of the film sheet conveyed to the lamination position whereby the rectangular panel conveyed to the lamination position is laid over the film sheet conveyed to the lamination position.

The invention defined by claim 8 includes, in addition to the features of the invention defined by claim 7, steps of positionally adjusting the rectangular panel, conveyed to the lamination position such that the center line of the rectangular panel is transversely aligned with the center line of the film sheet conveyed to the lamination position whereby the rectangular panel conveyed to the lamination position is laid over the film sheet conveyed to the lamination position with marginal edge portions of a predetermined width left to extend along the feed direction and/or along the transverse direction.

The invention defined by claim 9 includes, in addition to the features of the invention defined by claim 7, steps of positionally adjusting the rectangular panel conveyed to the lamination position such that such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

BRIEF DESCRIPTION OF THE DRAWINGS

FIG. 3A illustrates a continuous manufacturing system for manufacturing display panels including a slitting station A for forming film sheets in a strip shaped web of a film laminate;

FIG. 4 is a flowchart showing manufacturing steps performed by the continuous manufacturing system for manufacturing display panels using the strip shaped web of film laminate;

FIG. 5 is an enlarged diagrammatical view of the lamination station B in the continuous manufacturing system for manufacturing display panels;

FIG. 6 is a schematic view illustrating a lamination unit including a pair of lamination rollers located at a lamination position for laminating the rectangular panel with the film sheet, is the rectangular panel being fed in synchronization with the film sheet conveyed to the lamination station B;

FIG. 19 is a schematic diagram illustrating a manner of shifting the angularly adjusted rectangular panel which is in the position (P') that is displaced in the longitudinal and transverse directions by amounts of displacements (m, n) from the film sheet current position (F) to align a rectangular panel conveyed to the lamination position in synchronization with the film sheet which has also been conveyed to the lamination position, according to the third embodiment of the present invention; and FIG. 20 is a flowchart showing the lamination process, including aligning, of the film sheet and the rectangular panel, according to the third embodiment of the present invention.

BEST MODE FOR CARRYING OUT THE INVENTION

The present invention will now be described with reference to embodiments of a display panel continuous manufacturing system (FIG. 3A) using a strip shaped film laminate 10 as shown by before use part A in FIG. 1 and including a slitting station A for forming film sheets 15 and a method for aligning the film sheets 15 with rectangular panels W at a lamination unit 200 which is included in the continuous manufacturing system.

Figure 1:
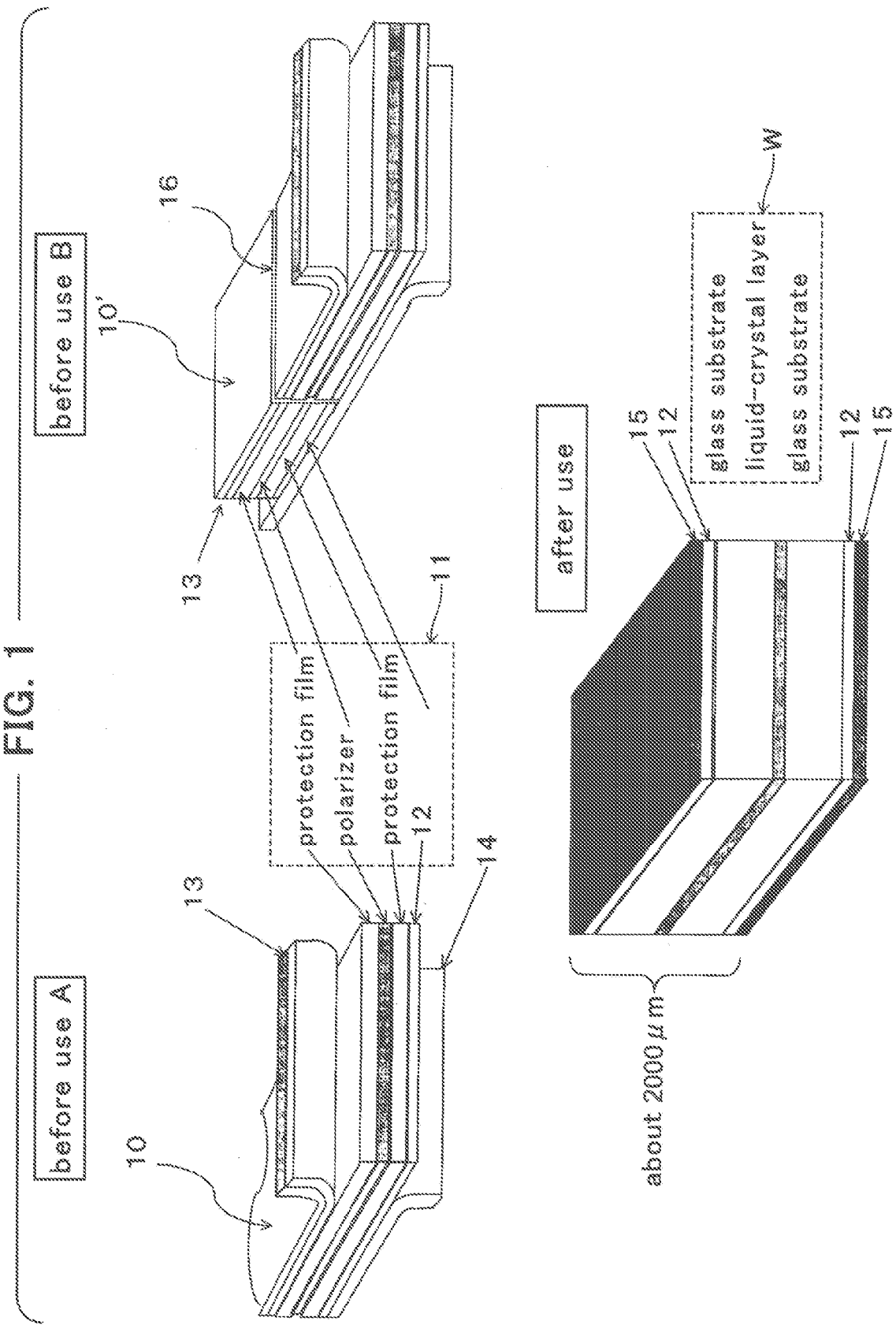
FIG. 1 is a schematic diagram illustrating the structure of a strip shaped film laminate and a display panel.

It is to be noted with reference to FIG. 1 that the view noted "before use" (B) illustrates a strip shaped film laminate which is different from that noted as "before use" (A). The view noted "before use" (B) illustrates a preliminarily slit strip shaped film laminate 10' having slit lines 16 formed in advance in a strip shaped film laminate in during the process of manufacturing the strip shaped film laminate. The continuous manufacturing system (FIG. 3B) of display panels adapted to use the strip shaped film laminate before use (B) does not require the slitting station A for forming the film sheets 15, and may instead include a check-up station A' for confirming previously formed slit lines 16. It is needless to mention that the method for aligning film sheets 15 with rectangular panels W at the lamination unit 200 is applicable to the continuous manufacturing system (FIG. 3B) of display panels.

(Outline of Continuous Manufacturing System of Display Panels)

FIG. 3A is a schematic diagram illustrating a continuous manufacturing system 1 of display panels in accordance with the present invention, the system 1 comprising a strip shaped film laminate feed unit 100 including a lamination unit 200 for laminating film sheets 15 respectively with rectangular panels W, the feed unit 100 being adapted to have a roll of the strip shaped film laminate mounted thereon for lamination with display panels, and a conveyance unit 200 for conveying rectangular panels W for laminating them with the film sheets

15 formed from the continuous web of the conveyed strip shaped film laminate 10. The system 1 comprises at least a slitting station A for forming the film sheets in the continuous web of the fed strip shaped film laminate 10 and a lamination station B for laminating the film sheets 15 with the rectangular panels W. FIG. 4 is, as described later, a flowchart showing each of processes or manufacturing steps for continuously manufacturing display panels illustrated in FIG. 3A.

The strip shaped film laminate feed unit 100 comprises a support rack 110 for rotatably mounting a roll of the strip shaped film laminate 10, a reading unit 120 for reading slitting position information, a film feed unit 130 including a pair of feed rollers, a speed adjustment unit 140 including a dancing roller for providing a constant film feeding speed, a slitting unit 150 in the slitting station A for forming slit lines in a transverse direction with respect to the feeding direction of the continuous web of the strip shaped film laminate 10 at a side opposite to a continuous carrier film 14 to a depth reaching a surface of the continuous carrier film 14 adjacent to an adhesive layer 12, a slitting position check-up unit 160 in the slitting station A for checking the position of the formed slit lines 16, a film feed unit 170 including a pair of feed rollers, a speed adjustment unit 180 including a dancing roller for providing a constant film feeding speed, a lamination unit 200 including a pair of lamination rollers in the lamination station B for peeling the film sheets 15 formed between an upstream slit line and a downstream slit line in a transverse direction with respect to a feeding direction of the strip shaped film laminate 10 to be laminated with the rectangular panels W, a carrier film take-up drive mechanism 210 for taking up the continuous carrier film 14, an edge detection unit 220 in the same lamination station B for detecting a leading edge of the film sheets of the polarizing composite film, and a straight-ahead-posture or position detection unit 230 for detecting displacement of advancing position of the film sheets 1.

(Providing Strip Shaped Film Laminate)

FIG. 1 is a schematic diagram illustrating structures of a strip shaped film laminate 10 or a preliminarily slit strip shaped film laminate 10' and a display panel manufactured with these film laminates. The strip shaped film laminates before use A and B are constructed as previously described. Description will be made herein with respect to the strip shaped film laminate before use A. The display panel illustrated in FIG. 1 comprises a rectangular panel W having film sheets 15 attached to the opposite surfaces thereof, each of the film sheets having a polarizing composite film 11 releasably attached to a carrier film 14 constituting a part of the strip shaped film laminate 10 and including an adhesive layer 12, the film sheets being attached such that the polarizing axes of the film sheets 15 cross each other at an angle 90°.

The roll of the strip shaped film laminate 10 mounted on the strip shaped film feed unit 100 preferably has a width identical to length of a side of the rectangular panel W in a transverse direction with respect to the feeding direction of the rectangular panel W to be laminated therewith or a width sufficient to leave an edge margin along a side in the feeding direction of the rectangular panel W. As shown in the before use (A) part in FIG. 1, the strip shaped film laminate 10 comprises a polarizing composite film 11 having a polarizing film and surface protection films provided on the opposite surfaces of the polarizing film, an adhesive layer 12 applied to the polarizing composite film 11 at a surface which is to be laminated with the rectangular panel W, a surface protection film 13 having an adhesive surface and laminated on the polarizing composite film 11 at the surface on which the adhesive layer 12 is not provided, and a continuous carrier film releasably laminated to the adhesive layer 12 of the polarizing composite film 11.

The carrier film 14 is in the form of a releasable film adapted for protecting the adhesive layer of the polarizing composite film 11 during the process of continuously manufacturing display panels, and is removed by being taken up into a roll when the film sheets 15 formed in the continuous polarizing composite film 11 are peeled off the strip shaped film laminate 10 prior to or during the process of laminating the sheets to the rectangular panels W.

FIG. 3A is a schematic diagram illustrating an apparatus for continuously manufacturing display panels. The apparatus 1 is constructed as a continuous manufacturing system of display panels, wherein a control unit 400 causes each unit to operate, and, in the slitting station A, the film sheets 15 are formed from the polarizing composite film 11 including the adhesive layer 12 releasably laminated on the continuous carrier film 14 included in the strip shaped film laminate 10, the formed film sheets 15 being fed to the lamination unit in the lamination station B, and peeled from the continuous carrier film 14, and the rectangular panels being conveyed in a manner synchronize with feeding of the peeled film sheets 15 to be laminated therewith.

Figure 7:
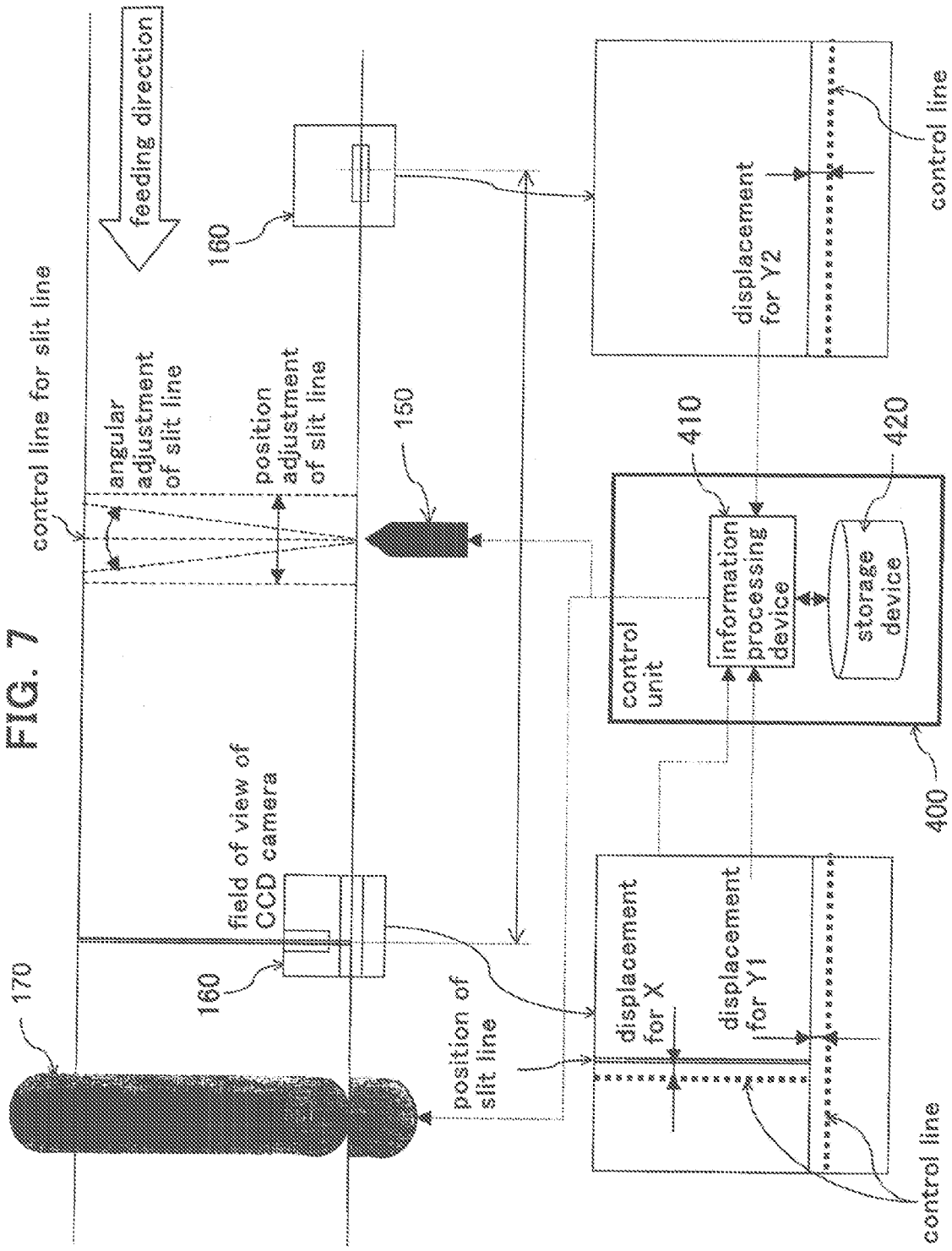
FIG. 7 is an enlarged diagrammatical view illustrating the slitting station A for forming slit lines in the web of film laminate in a perpendicular direction with respect to the feeding direction.

Control of the entire continuous manufacturing system of display panels is outlined as follows. The control unit 400 causes the film feed unit 130 including a pair of feed rollers to operate based on, for example, acquired slitting position information to feed a continuous web of the strip shaped film laminate 10, although not limited to such arrangement. The control unit 400 further causes the speed adjustment unit 140 to operate to temporarily stop the feeding of the continuous web of the strip shaped film laminate 10. The control unit 400 then operates the slitting unit 150 at the slitting station A to form slit lines 16 in a transverse direction with respect to the feeding direction of the continuous web of the strip shaped film laminate 10 at a side opposite to the continuous carrier film 14 to a depth reaching a surface of the continuous carrier film 14 adjacent to the adhesive layer 12. An example of the slitting station A is illustrated in FIG. 7.

It is needless to mention that it is important to form the film sheets 15 on which the rectangular panels W are to be laminated in an accurate rectangular shape for aligning the sheets with the panels. To this end, the slitting position check-up unit 160 may be operated to ensure that the slit lines 16 on the strip shaped film laminate 10 are accurately formed. The strip shaped film laminate 10 is fed by the carrier film take-up drive mechanism 210 to the lamination station B including the lamination unit 200 for laminating the rectangular panels W fed in synchronization with feeding the film sheets 15 each formed between an upstream slit line and a downstream slit line to extend in a transverse direction with respect to a feeding direction of the strip shaped film laminate 10, to be laminated with the rectangular panels W. The film sheets 15 are peeled off the continuous carrier film 14 by taking up only the continuous carrier film 14 via a peeling plate 211 at a position where leading edges of the film sheets 15 formed on the strip shaped film laminate 10 reach to the leading edges of the rectangular panels fed to the lamination station B. The peeled film sheets 15 are aligned with the rectangular panels W fed in synchronization with feeding the film sheets 15 at the lamination station B including a pair of lamination rollers where a lamination operation with the rectangular panels W is started therein.

FIG. 4 is a flowchart showing manufacturing steps carried out by the continuous manufacturing apparatus of display panels according to one embodiment of the present invention.

There are provided a film sheet reference or control position (FO) and a rectangular panel reference or control position (PO) in the lamination position, the film sheet control position (FO) being for positioning the film sheet 15 when the film sheet 15 is located on the center reference or control line (CO) indicating a direction along which the film sheet 15 and the rectangular panel W are to be fed, and the rectangular panel control position (PO) being for positioning the rectangular panel W when the rectangular panel W is located on the center control line (CO), although not limited to such arrangement. The position of the film sheet 15 conveyed to the lamination unit 200 of the lamination station B (hereinafter referred as "the film sheet current position (F)") illustrated in FIG. 4 is captured as an image by a CCD camera to determine an angle θ of the film sheet 15 with respect to the film sheet control position (FO) and amounts of longitudinal and transverse displacements (s, t) from the film sheet control position (FO) by detecting differences in contrast in the image taken by the camera. Similarly, the position of the rectangular panel W conveyed to the lamination unit 200 (hereinafter referred as "the rectangular panel current position (P)") is determined in terms of an angle θ1 of the rectangular panel W with respect to the rectangular panel control position (PO) and amounts of longitudinal and transverse displacements (X, Y) from the rectangular panel control position (PO). The manufacturing steps include a step of correcting the rectangular panel current position of the rectangular panel W conveyed to the lamination unit 200 in synchronization with the film sheet 15, based on the determined values, as later described in detail.

Figure 3B:
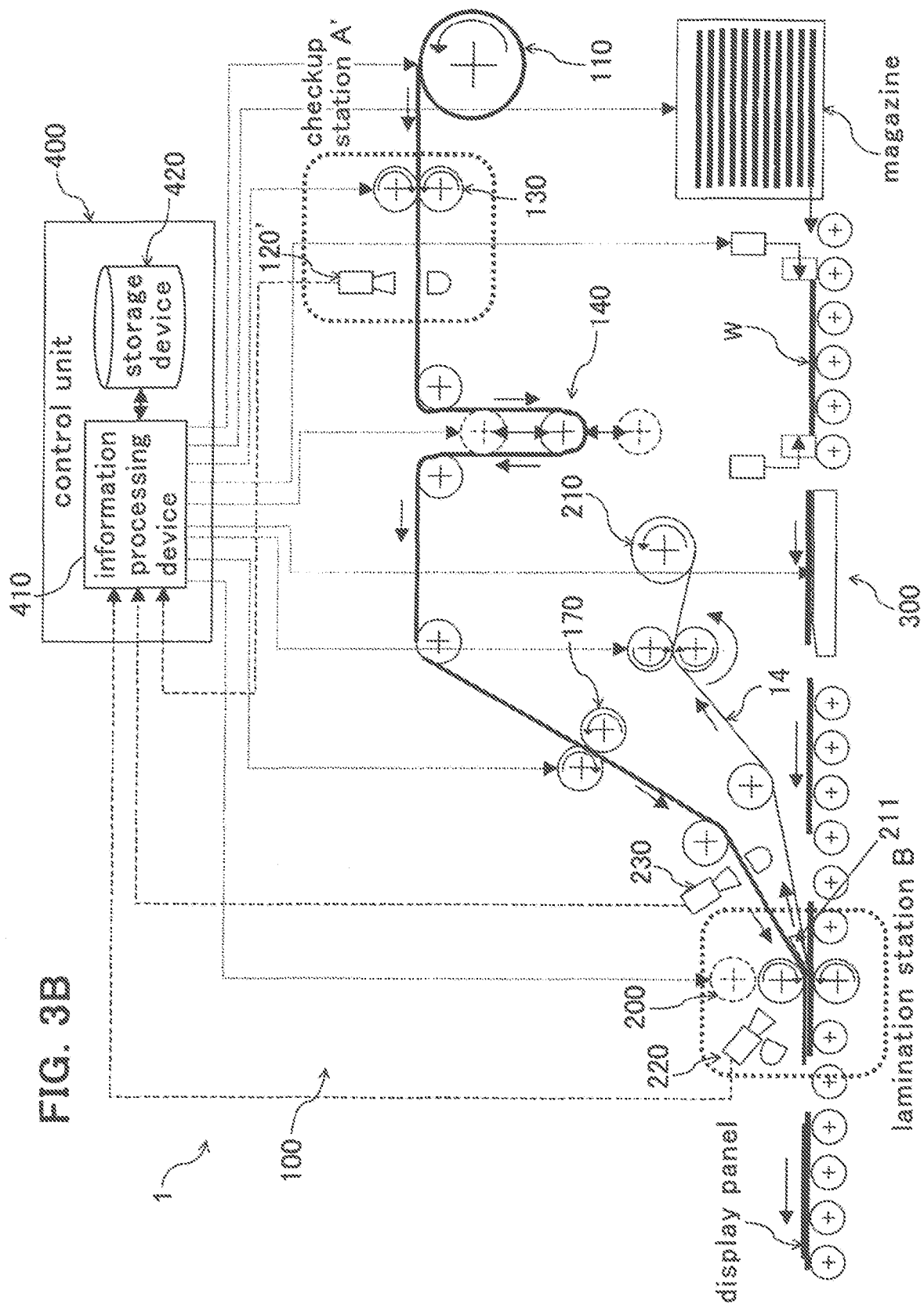
FIG. 3B illustrates a continuous manufacturing system for manufacturing display panels including a check-up station A' for checking film sheets preliminarily formed by predefined slit lines in the strip shaped web of film laminate.

It is to be noted that the continuous manufacturing system for a display panel illustrated in FIG. 3A and the flowchart showing manufacturing steps of the continuous manufacturing system of display panels illustrated in FIG. 4 are merely examples for explaining a method of aligning the film sheet 15 with respect to the rectangular panel W. It is needless to mention that a roll of a strip shaped film laminate 10' with predefined slit lines which is wounded to a roll after providing the predefined slit lines 16 to a transverse direction shown in the "before use" part in FIG. 1 and in FIG. 3B can be adopted as a strip shaped film laminate used for aligning at the continuous manufacturing system of display panels. In that case, the slitting station A is not required in the continuous manufacturing system of display panels (FIG. 3B), and instead, a slitting position checkup station A' including a checkup unit 120' for ensuring positions of the predefined slit lines 16 may only be necessary.

(Conveying Rectangular Panel W and Laminating with Film Sheet 15)

Detailed description will now be made on specific operations of each unit in the continuous manufacturing system of display panels operated by the control unit 400, according to one embodiment of the present invention. The operation includes a process of laminating the film sheet 15 with the rectangular panel W at the lamination station B. First, general description will be made on a rectangular panel conveyance unit 300 for the rectangular panel W which is to be laminated on the film sheet 15 formed from a continuous web of the strip shaped film laminate 10. Then, a lamination unit 200 including a pair of lamination rollers for laminating the rectangular panel W to the film sheet 15 will be outlined.

Figure 2:
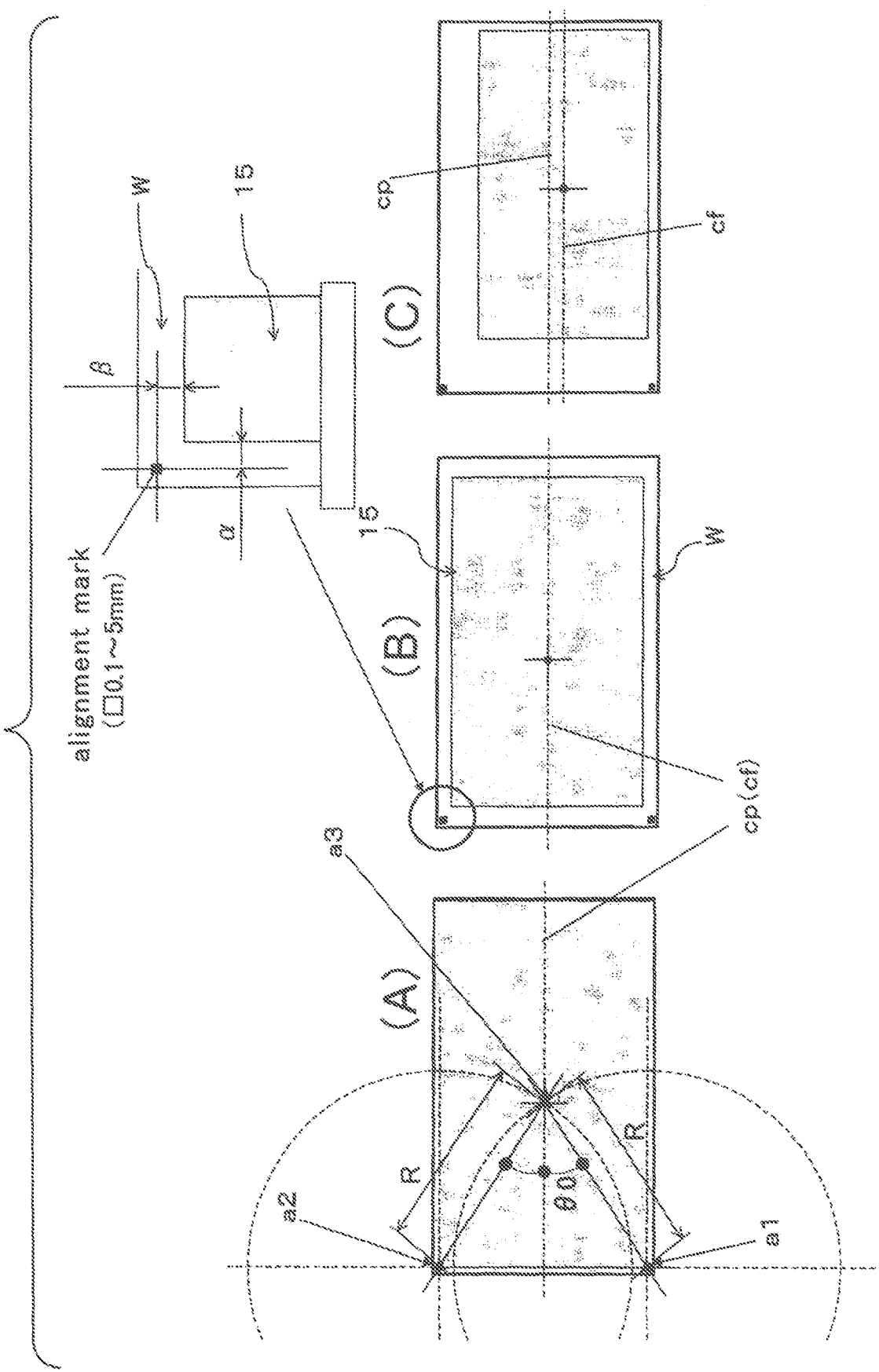
FIG. 2A is a schematic diagram illustrating another embodiment of a display panel comprising a film sheet and a rectangular panel; wherein the film sheet and the rectangular panel are completely laid over each other.
FIG. 2B is a schematic diagram illustrating another embodiment of a display panel comprising a film sheet and a rectangular panel; wherein the film sheet and the rectangular panel are laid one over the other with the center lines of the film sheet and the rectangular panel being transversely aligned and with marginal edge portions of a constant width being left to extend in the feeding direction and/or the transverse direction of the rectangular panel.
FIG. 2C is a schematic diagram illustrating another embodiment of a display panel comprising a film sheet and a rectangular panel; wherein the film sheet and the rectangular panel are laid one over the other with the center lines of the film sheet and the rectangular panel being oriented in parallel with each other and with marginal edge portions of a constant width being left to extend in the feeding direction and/or the transverse direction of the rectangular panel.

FIG. 2 is a schematic diagram illustrating display panels each comprises a film sheet 15 and a rectangular panel W in several different modes. FIG. 2 (A) illustrates a display panel where the film sheet 15 and the rectangular panel W are completely overlapped. FIG. 2 (B) illustrates a display panel where the film sheet 15 and the rectangular panel W are laid one over the other with the center lines of the film sheet and the rectangular panel being transversely aligned, leaving non-overlapping marginal edge portions of constant widths extending in the feeding direction and/or the transverse direction in the rectangular panel W. FIG. 2 (C) illustrates a display panel where the film sheet 15 and the rectangular panel W are laid one over the other with the center lines of the film sheet and the rectangular panel being parallel to each other, leaving non-overlapping marginal edge portions of constant widths extending in the feeding direction and/or the transverse direction in the rectangular panel W.

As illustrated in FIG. 2 (A), the rectangular panel W is formed at a right and left ends on a leading edge portion as seen in the feeding direction with a first alignment mark (a1) and a second alignment mark (a2). Further, a third alignment mark (a3) is defined as a virtual position at a location which is equidistant (R) from the first and the second alignment marks (a1, a2) on the center line (cp) extending in the feeding direction of the rectangular panel W. The rectangular panel W is aligned with and laminated on the film sheet 15 such that longer sides and shorter sides extending respectively from the first alignment mark (a1) and the second alignment mark (a2) are completely overlapped or non-overlapping marginal edge portions of constant widths are left in the feeding direction and/or the transverse direction of the rectangular panel to manufacture a display panel.

The rectangular panel W is slightly trimmed at peripheral portions in a wiring assembling step including mounting electronic components during a process of continuous manufacturing display panels. Alternatively, the rectangular panel W may have already trimmed peripheral portions. The peripheral portions of the rectangular panel may be trimmed in various ways. Thus, the peripheral portions of the rectangular panel W are determined by detecting the previously provided alignment marks or the previously defined alignment mark at the virtual position. Otherwise, the peripheral portions have to be determined by measuring lengths of shorter and longer sides of the rectangular panel W. The rectangular panel W is taken out one-by-one by the feed unit from a magazine storing a plurality of rectangular panels, then, for example, after cleaning/polishing, is adjusted to a constant speed with a constant interval and conveyed to the lamination unit 200 of the lamination station B by the conveyance unit, for lamination with the film sheet 15.

FIG. 5 is an enlarged diagrammatical illustration of the lamination station B. The lamination station B comprises a pair of lamination rollers, a lamination unit 200 including an edge detection unit 220 and a straight-ahead-posture or position detection unit 230 for the film sheet 15, and a part of a rectangular panel conveyance unit 300 including an alignment unit 320 for the rectangular panel W, a lamination position conveyance unit 330 and an edge detection unit 340 for the rectangular panel W. The conveyance unit 300 includes, for example, a part of the lamination unit consisting of a unit for controlling the posture of the rectangular panel W at the last step of sequentially feeding the rectangular panels W to the lamination station B in synchronization with the film sheet 15 being conveyed to the lamination station B.

FIG. 6 is a schematic diagram illustrating operations of the alignment unit 320 and the lamination position conveyance unit 330 configuring a part of the lamination unit 200. As described later, the rectangular panel W is conveyed toward left from the pre-alignment unit 310 (FIG. 5) that is located in the right-hand portion. A plurality pairs of conveyance means 322 are arranged in spaced apart relationship at opposite sides with respect to the feeding direction for carrying the rectangular panel W, although not limited to such arrangements. An alignment table 321 is located between the series of laterally spaced apart pairs of conveyance means, the alignment table being movable for lifting and descending movements and mounted for shifting movements in longitudinal and transverse directions as seen in the feeding direction of the rectangular panel W and for a rotational movement. The rectangular panel W carried on the conveyance means 322 is lifted by the alignment table 321 to be moved apart from the conveyance means 322.

The alignment unit 320 may additionally be provided with a suction type holding means 323 in the alignment table 321 to hold the rectangular panel W to the alignment table 321. For example, in the case where the rectangular panel W is loaded on the conveyance means 322 with an angle θ1>0 with respect to the center reference line (CO) of the rectangular panel reference position (PO), the alignment table 321 is lifted to thereby have the rectangular panel W separated from the conveyance means 322. Then, the rectangular panel W is angularly adjusted by the alignment table 321 so that the relation θ1=0 is established with respect to the feeding direction. Finally, the position of the rectangular panel W is adjusted in the longitudinal and transverse directions with respect to the feed direction.

On the other hand, the film sheet 15 is preferably transported to the lamination unit 200 of the lamination station B by being adjusted to a constant feeding speed by the carrier film 14. At the lamination station B, only the carrier film 14 is peeled by being advanced along an acute angle path through a peeling plate 211 to be taken up by the carrier film take-up drive unit 210, as shown in FIG. 5. By peeling the carrier film 14 at the acute angle, an adhesive layer 12 of the film sheet 15 can be gradually exposed. The leading edge of the film sheet 15 is thereby slightly exposed so that the leading edge of the rectangular panel W is aligned with the exposed leading edge of the film sheet 15.

The present invention is directed to a problem of how to accurately align the leading edges of the film sheet 15 with the rectangular panel W. Thus, the leading edge of the film sheet 15 formed from the strip shaped film laminate 10 used for the continuous manufacturing system of display panels should be perpendicular to the center line (cf) extending in the feeding direction of the film sheet 15.

FIG. 7 is an enlarged diagrammatical view illustrating one embodiment for accomplishing such result. This can also be applied to the slitting station A of FIG. 3A. Although it is not applied to the continuous manufacturing apparatus of display panels of FIG. 3B which does not require the slitting station A, it is needless to mention that it may be applied to an apparatus for manufacturing the strip shaped film laminate 10' with predefined slit lines which is used for the apparatus of FIG. 3B.

FIG. 7 shows a system for ensuring that the position of the slit line 16 formed in the continuous web of the strip shaped film laminate 10 in transverse direction with respect to the feeding direction of the continuous web of the strip shaped film laminate 10 is in coincidence with the position calculated from measurement data of feed-out length of the continuous web. This ensuring procedure is performed by determining the accurate position of the continuous web in the feeding direction (X direction) and the transverse direction (Y direction). Although not limited, for this ensuring procedure, the actual position and a displacement from the reference position of the formed slit line 16 are measured at two locations, one upstream side of and the other downstream side of the reference position for the slit line 16. The displacement is determined in terms of distances in X direction and Y direction of the side edge portions of the film sheet 15 from the respective control lines. The position of the slit line 16 actually formed in the strip shaped film laminate 10 and the positions of the edge portions of the film sheet 15 are captured in the form of an image by, for example, the slitting position check-up unit 160 including a CCD camera. There are provided in advance in the image taking range reference lines for respective ones of the positions. The position of the slit line 16 formed in the strip shaped film laminate 10 and the positions of the edge portions of the film sheet 15 are determined in terms of differences in contrast in the captured image, although not limited to such procedure. Then, calculations are carried out to obtain distances (displacements) of the position of the formed slit line 16 with respect to the reference line and of the positions of the edge portions of the film sheet 15 with respect to the reference positions, and based on the calculated distances (displacements), the position and angle of the slitting unit 150 are adjusted in the forward or rearward direction with respect to the feeding direction of the continuous web of the strip shaped film laminate 10.

The film sheets 15 defined by the slit lines 16 are then conveyed to the lamination unit 200 of the lamination station B. As shown in FIG. 3A or FIG. 3B, the leading edge portion of the film sheet 15 is introduced into a nip of the pair of the lamination rollers of the lamination unit 200 while the rollers are vertically spaced apart from each other and detected by a film sheet edge detection unit 220. The film sheet 15 is conveyed while it is laminated to the carrier film 14, but it is seldom that the angle θ in the feeding direction of the carrier film 14 is accurately aligned to establish the relation θ=0.

The aligning procedure of the present invention will hereinafter be described. FIG. 8 to FIG. 11 are schematic diagrams for explaining the first aspect of the present invention.

Figure 8:
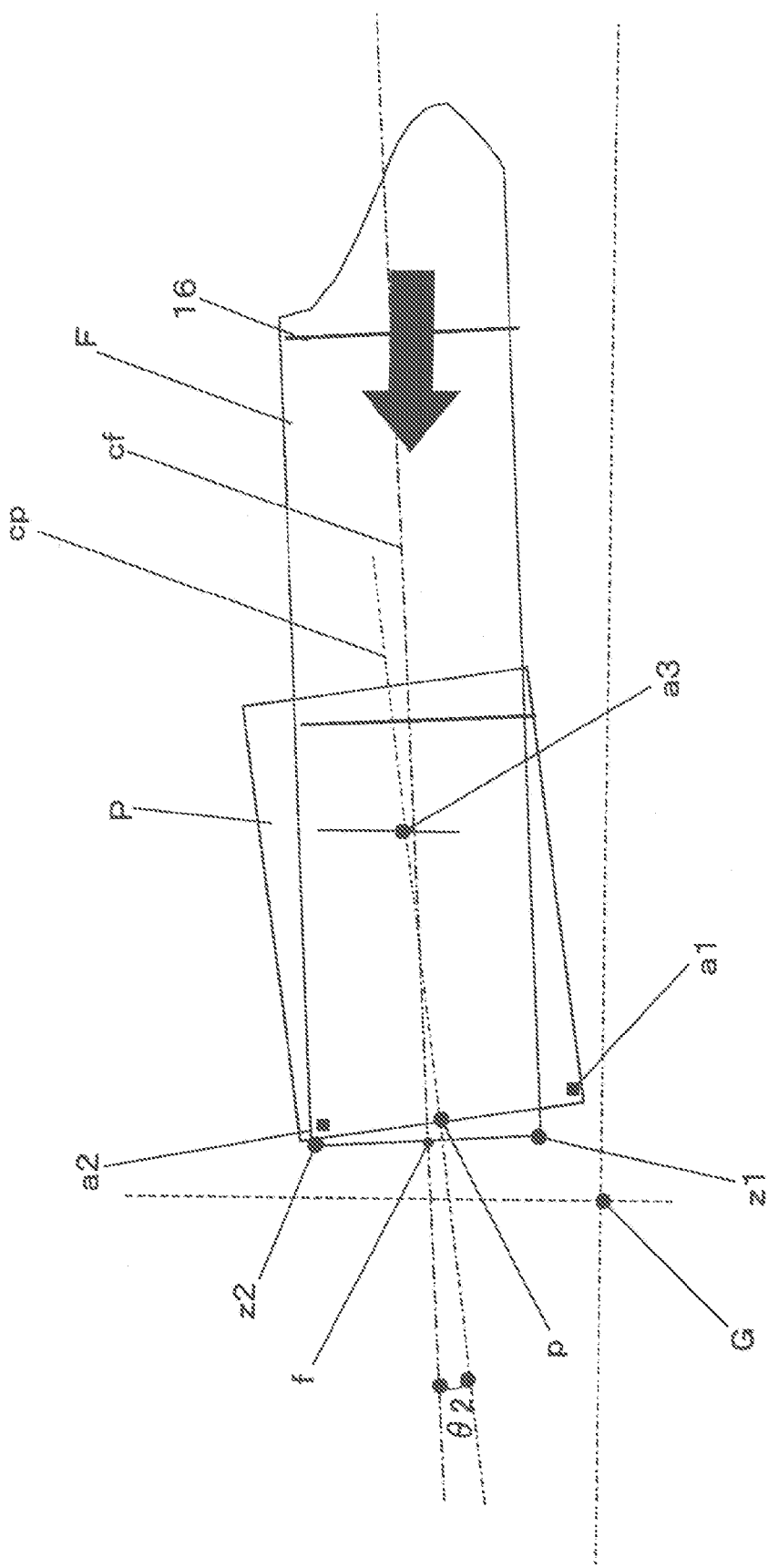
FIG. 8 is a diagrammatical view illustrating a film sheet current position (F) and a rectangular panel current position (P) in terms of a crossing angle θ2 between center lines extending in feeding directions of the film sheet and the rectangular panel conveyed to the lamination position, and leading edge positions (f, p) of the respective center lines, according to the first aspect of the present invention.

FIG. 8 is a schematic diagram illustrating the film sheet current position (F) and the rectangular panel current position (P) in terms of a crossing angle θ2 of the center lines (cf, cp) extending in the feeding directions of the film sheet q5 and the rectangular panel W conveyed to the lamination position, and the leading edge positions (f, p) of the respective center lines, according to the first aspect of the present invention.

Figure 9:
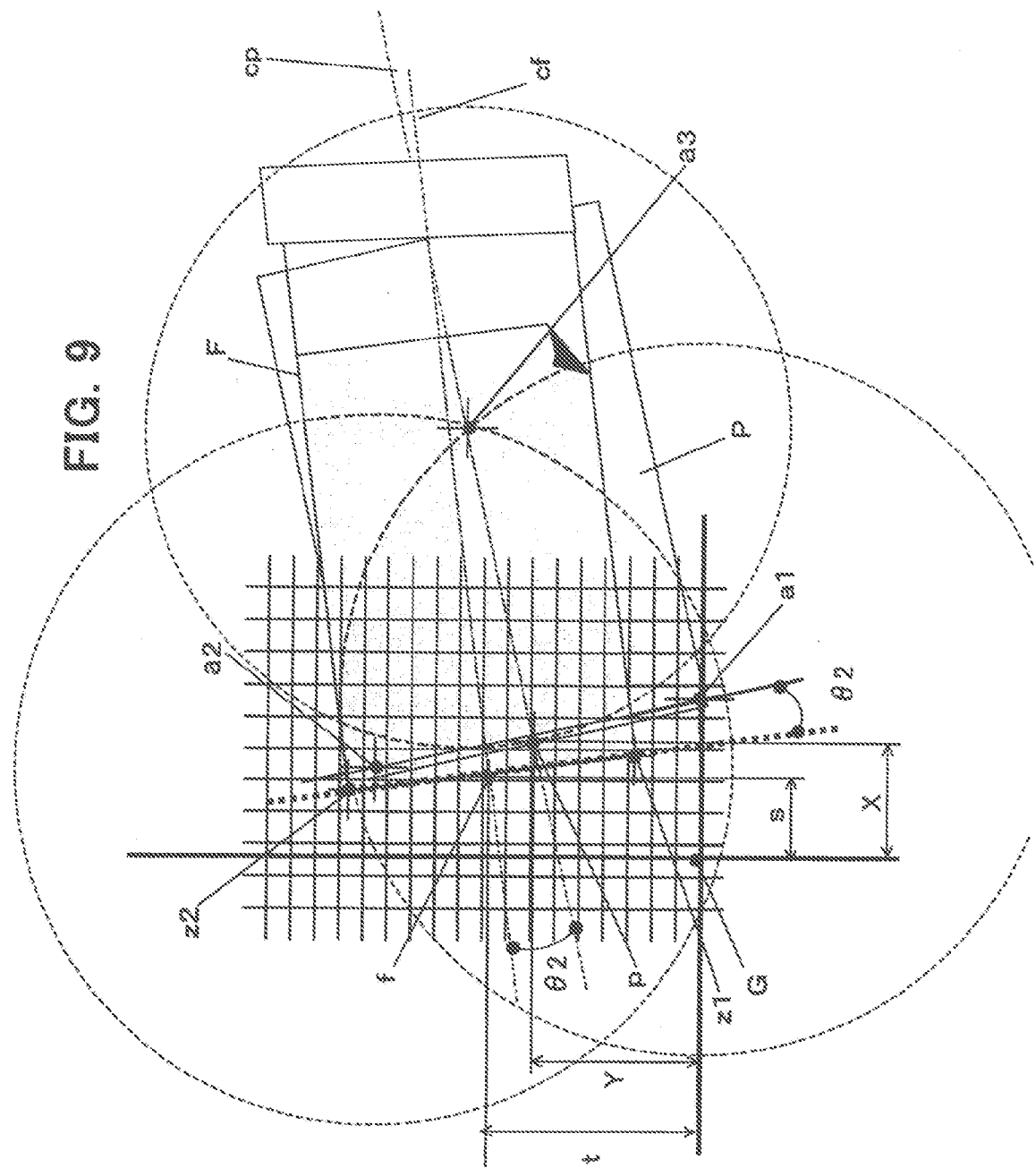
FIG. 9 is a diagrammatical view illustrating the manner of determining the crossing angle θ2 between center lines extending in the feeding directions and coordinates of the leading edge positions (f, p) of the film sheet n the current position (F) and the rectangular panel in the current position (P), by using a gradient of a virtual line passing through a first fixed point (z1) and a second fixed point (z2) in the film sheet calculated based on an arbitrary origin (G) within a visualized image, and a gradient of a virtual line connecting a first alignment mark (a1) and a second alignment mark (a2) of the rectangular panel, according to the first aspect of the present invention.

FIG. 9 is a schematic diagram illustrating a manner of determining the crossing angle θ2 between center lines extending in the feeding directions of the film sheet and the rectangular panel transported to the lamination position at the film sheet current position (F) and the rectangular panel current position (P), and coordinates of the leading edge positions (f, p) of the center lines, by using a gradient of a virtual line passing through a first fixed point (z1) and a second fixed point (z2) in the film sheet 15 calculated based on an arbitrary origin (G) within the captured image, and a gradient of a virtual line passing through the first alignment mark (a1) and the second alignment mark (a2) of the rectangular panel W, according to the first aspect of the present invention.

The film sheet 15 conveyed to the lamination position preferably has at least the first fixed point (z1) and the second fixed point (z2) provided on the left and the right side of the leading edge. The coordinates of the fixed points can be calculated based on the origin (G) within the image captured by the CCD camera of the edge detection unit 220 and the straight-ahead-posture or position detection unit 230 for the film sheet 15, although not limited to such procedure. The calculated coordinates are stored in a storage device 420 as data by the control unit 400.

The rectangular panel W is conveyed into the nip of the pair of the lamination rollers of the lamination unit 200 while they are vertically spaced apart from each other, at a constant interval and a constant speed from the feed-out unit including a storage magazine of the rectangular panel W. The first alignment mark (a1) and the second alignment mark (a2) are preliminarily provided on the left and the right end portions of the leading edge of the rectangular panel W conveyed one-by-one, and further, a third alignment mark (a3) is defined at a virtual position on the center line (cp) extending in the feeding direction of the rectangular panel W. The rectangular panel conveyance unit 300 controls the posture or position of the rectangular panel W based on the alignment marks. The rectangular panel W aligned by the pre-alignment unit 310 is loaded on the plurality of pairs of conveyance means 322 arranged with spaces on both sides of the conveying path of the rectangular panel W with respect to the feeding direction, as shown in FIG. 6. It is also seldom that the angle θ1 in the feeding direction of the rectangular panel W is accurately aligned to establish the relation θ1=0.

Figure 10:
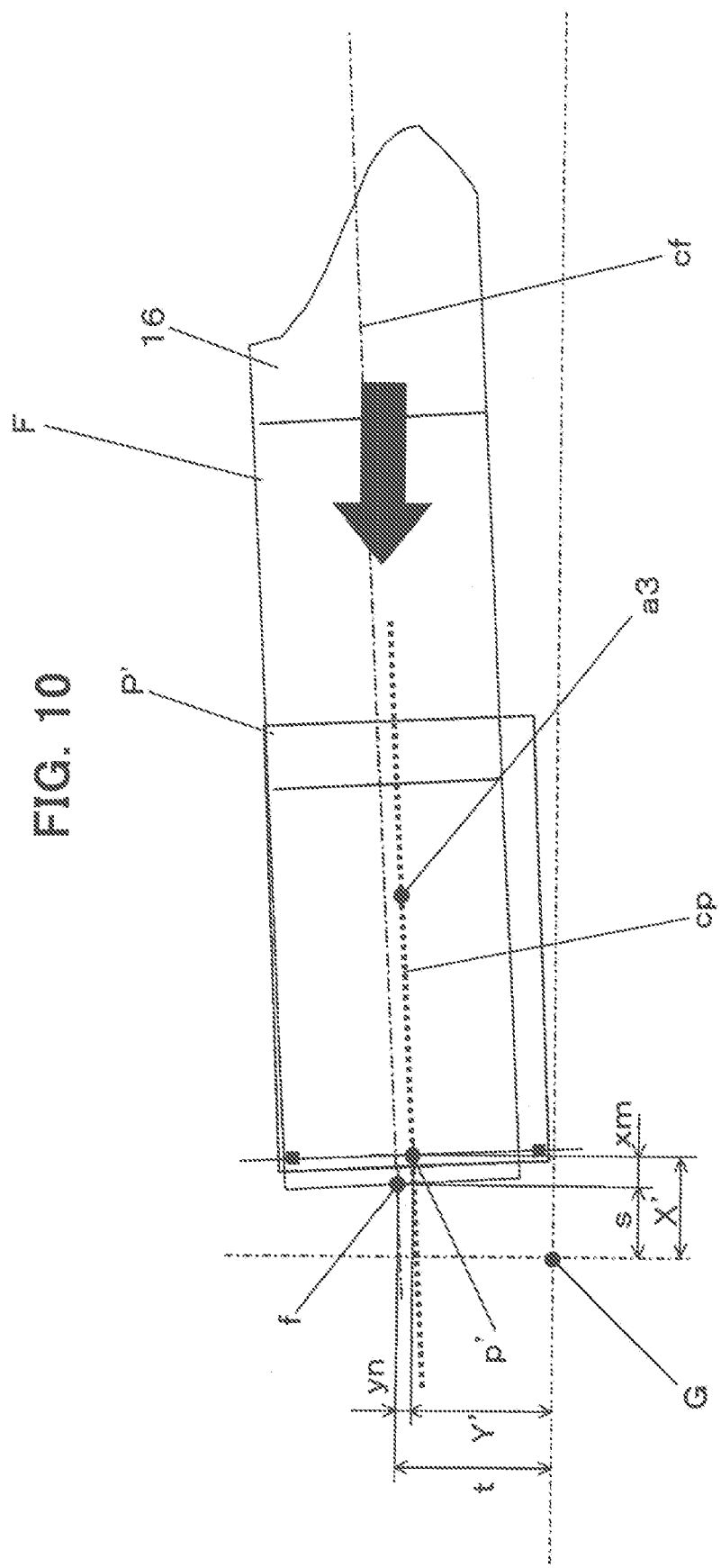
FIG. 10 is a schematic diagram illustrating a manner of calculating the displacement of the leading edge position (p') of the center line of the rectangular panel in terms of a longitudinal distance and a transverse distance (xm, yn) from the leading edge position (f) of the center line at the film sheet current position, after an angle adjustment (for rendering θ2=0), by respectively calculating the coordinates, with respect to the origin (G), of the leading edge positions of the center lines extending in the feeding direction of the film sheet and the rectangular panel at the current positions, according to the first embodiment of the present invention.
Figure 11:
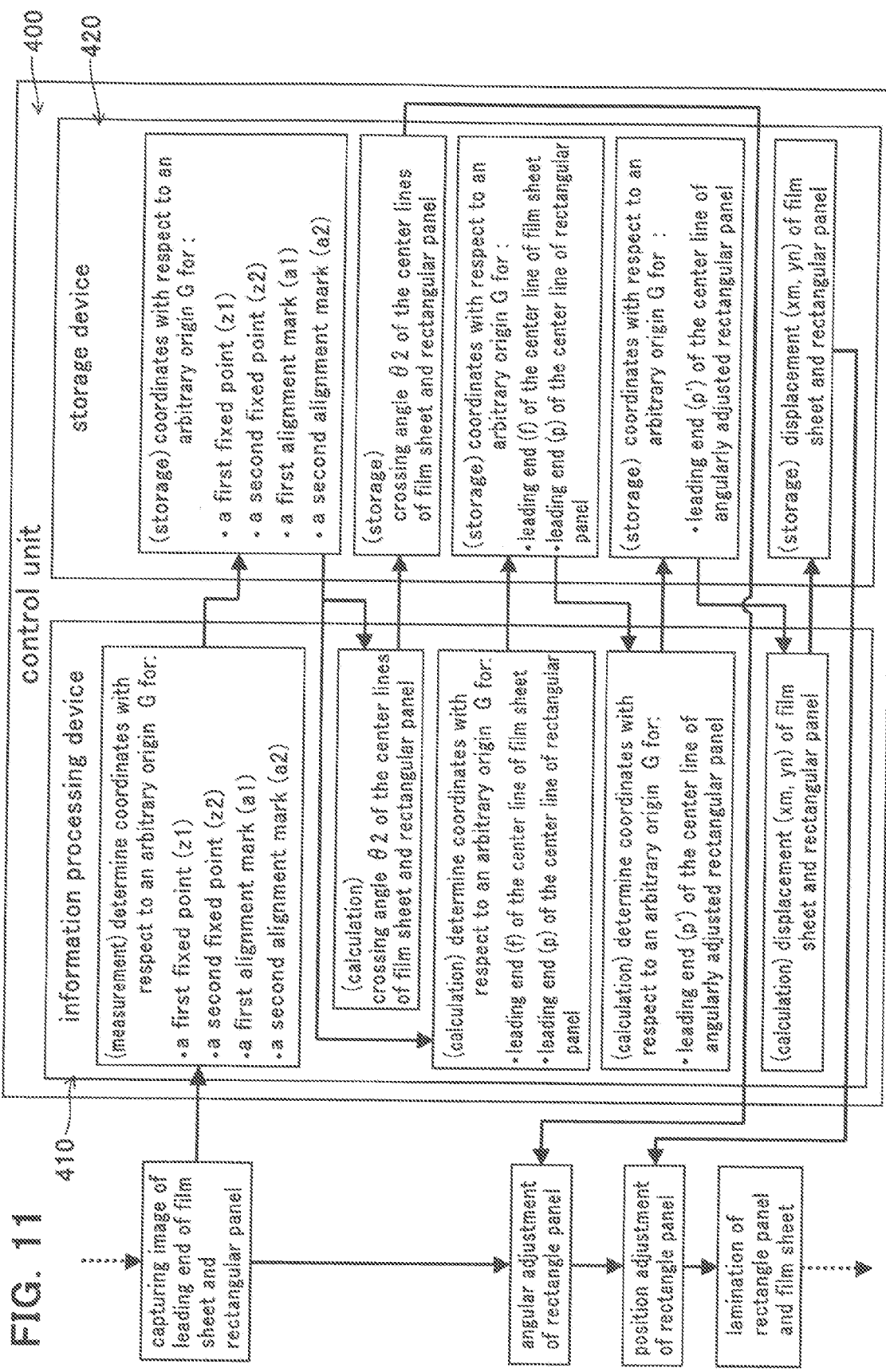
FIG. 11 is a flowchart showing the lamination process, including aligning, of the film sheet and the rectangular panel, according to the first embodiment of the present invention.

FIG. 10 is a schematic diagram illustrating a manner of calculating the amount of displacement of the leading edge position (p') of the center line of the rectangular panel W in terms of a longitudinal and transverse distances (xm, yn) from the leading edge position (f) of the center line of the film sheet in its current position, after an angle adjustment (for θ2=0) has been made, by respectively calculating the coordinates, with respect to the origin (G), of the leading edge positions of the center lines extending in the feeding direction at the film sheet current position (F) and the rectangular panel current position (P), according to the first aspect of the present invention. Further, FIG. 11 is a flowchart showing a lamination process, including aligning, of the film sheet and the rectangular panel, according to the first aspect of the present invention.

The rectangular panel W is captured by, but not limited to, at least two pairs of CCD cameras of an alignment mark detection unit 340 to be imaged. The coordinates of the alignment marks (a1, a2) previously provided on the rectangular panel W can be calculated based on the origin (G) arbitrary defined within an image, as described in detail in the following. The calculated coordinates are stored as data in the storage device 420 by the control unit 400.

As shown in FIG. 8, the crossing angle θ2 of the center lines (cf, cp) extending in the feeding direction of the film sheet 15 and the rectangular panel W is calculated and stored as a crossing angle θ2 formed between a virtual line passing through the first fixed point (z1) and the second fixed point (z2) on the left and the right edge of the leading edge of the film sheet 15, and a virtual line passing through the first alignment mark (a1) and the second alignment mark (a2) of the rectangular panel W. Based on the calculated angle θ2, the control unit 400 functions to rotate the rectangular panel W loaded on the alignment table 321 around the third alignment mark (a3) to angularly adjust the leading end (p) of the center line (cp) of the rectangular panel W so that the crossing angle θ2 is made 0. FIG. 10 illustrates the angularly adjusted rectangular panel position (P'). As apparent from FIG. 10, the leading end position of the center line (cp) of the rectangular panel W is displaced from the coordinates of the leading end position before adjustment (p) to the coordinates of the leading end after adjustment (p').

A specific calculating method is described in detail with reference to FIGS. 9 and 11. In determining two virtual lines, an arbitrary point is first defined as the origin (G) in an image taken by, for example, an CCD camera. Then, the coordinates of the first alignment mark (a1) and the second alignment mark (a2), as well as the coordinates of the first fixed point (z1) and the second fixed point (z2) are determined with reference to the origin (G). Based on the determined coordinates, it is possible to determine a virtual line y1 passing through the first alignment mark (a1) and the second alignment mark (a2) and a virtual line y2 passing through the first fixed point (z1) and the second fixed point (z2) using the following equations.

$$y1 = \alpha_1 x + \beta_1 \quad (1)$$

$$y2 = \alpha_2 x + \beta_2 \quad (2)$$

where β1 and β2 are intercepts.

The crossing angle θ2 of the center lines (cf, cp) in the feeding direction of the film sheet 15 and the rectangular panel W can be determined in accordance with the following equation based on the gradient (α1, α2) of the determined virtual lines y1 and y2.

$$\tan \theta_2 = (\alpha_2 - \alpha_1)/(1 + \alpha_1 \cdot \alpha_2) \quad (3)$$

The rectangular panel W is angularly adjusted in accordance with the determined angle θ2 about the third alignment mark (a3) so that the center line (cp) extending in the feeding direction of the rectangular panel W is placed in parallel with the center line (cf) extending in the feeding direction of the film sheet 15. Subsequently, the rectangular panel W is adjusted in position so that it is laid over the film sheet 15.

Refer to FIG. 9. The leading ends (f, p) of the respective center lines positioned on the leading edges of the film sheet 15 and the rectangular panel W can be represented as in the following manner. Specifically, it is to be noted that the point (f) of the center line positioned on the leading edge of the film sheet 15 and bisecting the line connecting the first fixed point (z1) and the second fixed point (z2) is represented by coordinates (s, t) with respect to an arbitrary origin (G). Similarly, the point (p) of the center line positioned on the leading edge of the rectangular panel W and bisecting the line connecting the first alignment mark (a1) and the second alignment mark (a2) is represented by coordinates (X, Y) with respect to the origin (G).

As shown in FIG. 10, the rectangular panel W is angularly adjusted to the position (P') about the third alignment mark (a3) so that the crossing angle θ2 between the center line (cp) of the rectangular panel W and the center line (cf) of the film sheet 15 becomes 0. Through this adjustment, the leading end position of the center line (cp) on the leading edge of the rectangular panel W is shifted from p to p'. The coordinates (X', Y') of the leading end in the shifted position (p') may be calculated based on the coordinates (X, Y) of the leading end (p) before shifting and the crossing angle θ2. The amount of displacement of the leading end (p') of the center line (cp) of the rectangular panel W from the leading end (f) of the center line (cf) of the film sheet 15 is then calculated in terms of a longitudinal distance xm and a transverse distance yn to be stored in the memory. The control unit 400 causes the alignment table 321 loaded with the rectangular panel W to move longitudinally and transversely for the calculated distances xm and yn. Thus, the rectangular panel W is adjusted in position to be aligned with the film sheet 15. The aligned film sheet 15 and the rectangular panel W are passed through a pair of lamination rollers to be pressed toward each other and conveyed so that continuous manufacturing of display panels is thereby carried out.

Referring to the flowchart of FIG. 11, the aligning process of the present invention is conducted in the following manner. The film sheet 15 and the rectangular panel W are partly laid one over the other in the lamination position, and the images of the first and the second fixed point (z1, z2) of the film sheet 15 and the first and the second alignment marks (a1, a2) of the rectangular panel W are read to be used for determining and storing their coordinates with respect to an arbitrary origin (G) within the image. Based on the coordinates, calculation is carried out to determine the crossing angle θ2 between the center line (cp) of the rectangular panel W and the center line (cf) of the film sheet 15 and the calculated result is stored. The control unit 400 functions to rotate the alignment table 321 by an amount corresponding to the calculated angle θ2 to angularly adjust the rectangular panel W.

On the other hand, the stored values of the coordinates of the first and the second fixed points (z1, z2) of the film sheet 15 and the first and the second alignment marks (a1, a2) of the rectangular panel W are used to calculate coordinates (f, p') of the leading ends of respective ones of the center lines on the leading edges of the film sheet 15 and the angularly adjusted rectangular panel W, and calculated results are stored. Calculation is carried out based on the coordinates of the leading ends (f, p') to obtain the amounts (xm, yn) of displacements between the film sheet 15 and the angularly adjusted rectangular panel W, and the calculated results are stored. The control unit 400 causes the angularly adjusted rectangular panel W loaded on the alignment table 321 to move longitudinally and transversely by amounts corresponding to the calculated amounts (xm, yn) of displacements to adjust in position the rectangular panel W. After the angular and positional adjustments, the film sheet 15 and the rectangular panel W are laminated as shown in FIG. 2.

FIG. 12 to FIG. 17 are schematic diagrams for explaining the second aspect of the present invention. The following description may partially overlap with the description referring to the flowchart in FIG. 4 showing the manufacturing steps in the continuous manufacturing system of display panels.

Figure 12:
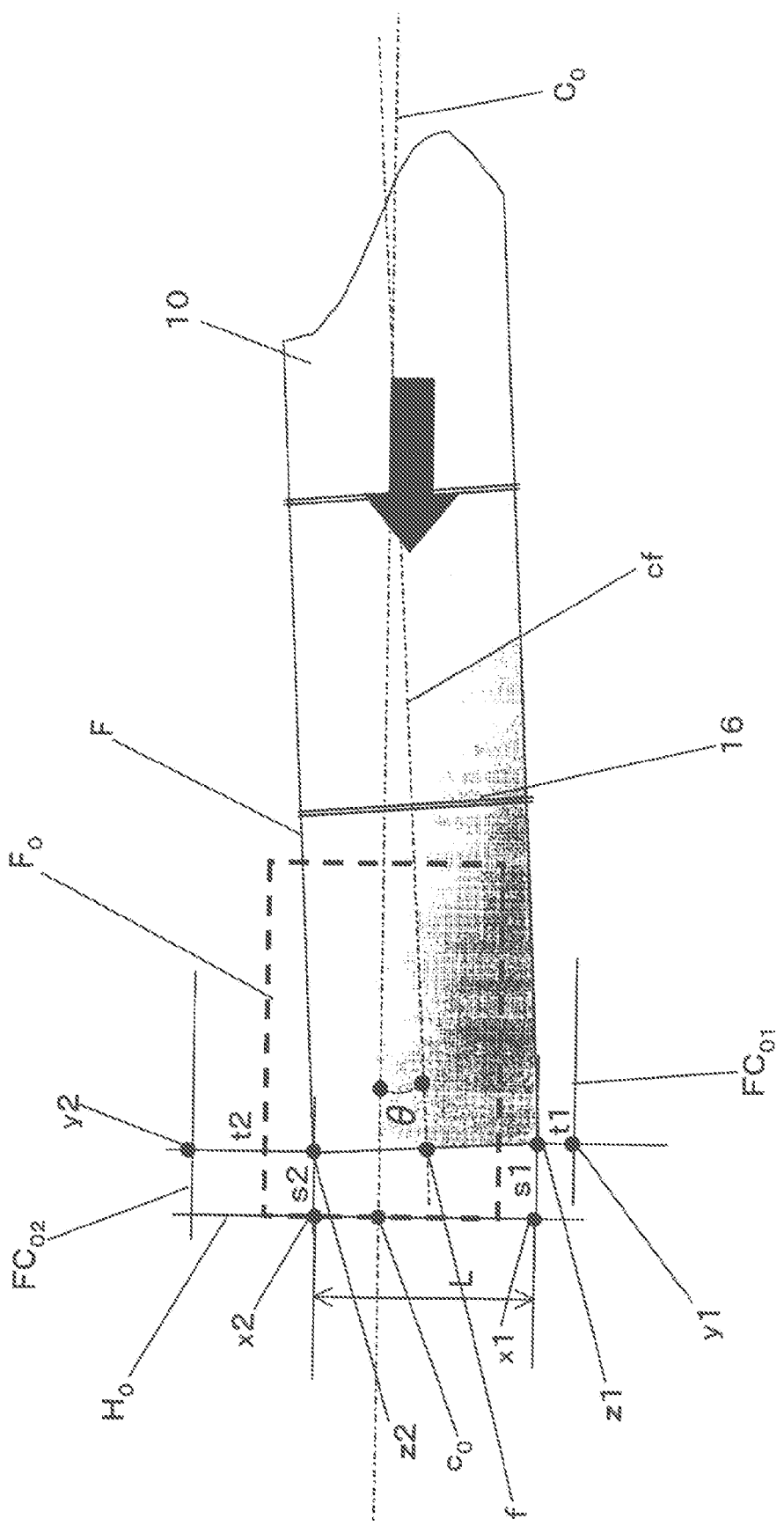
FIG. 12 is a schematic diagram illustrating the film sheet position (F) at the current position with respect to the film sheet position (FO) at the control position, according to a second embodiment of the present invention.

FIG. 12 is a schematic diagram illustrating the film sheet current position (F) with respect to the film sheet reference or control position (FO), according to the second aspect of the present invention. The rectangle shown by dotted lines is the film sheet control position (FO) wherein the film sheet 15 is located in alignment with the center control line (CO) which is a line indicating the direction along which both of the film sheet 15 and the rectangular panel W are to be conveyed. A series of rectangles shown by solid lines defined by a plurality of film sheet slit lines 16 in the strip shaped film laminate 10 designate the film sheet current position (F) with respect to the film sheet control position (FO).

Figure 13:
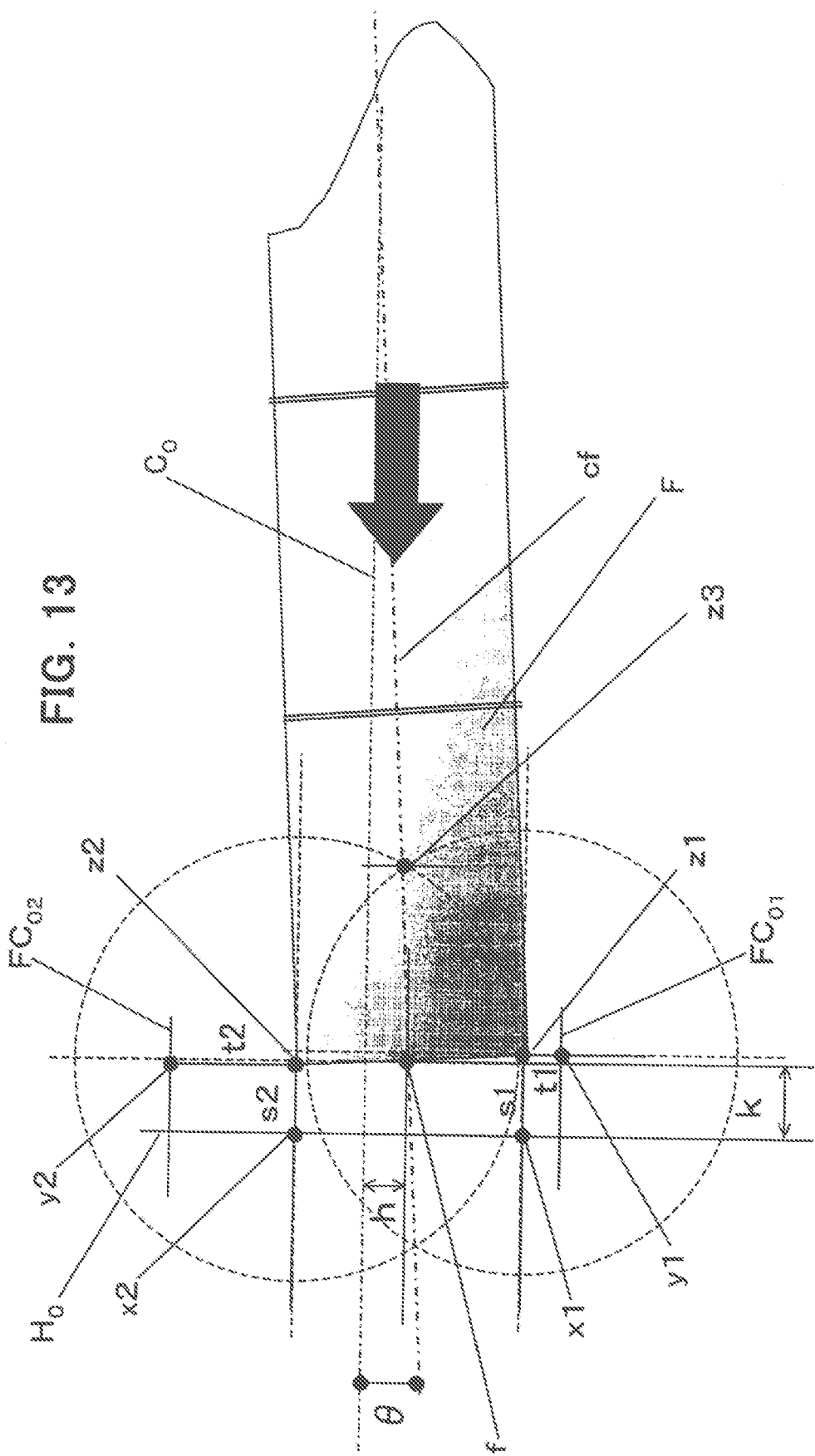
FIG. 13 is a schematic diagram illustrating the film sheet position (F) at the current position, according to the second embodiment of the present invention.

FIG. 13 is a schematic diagram illustrating the film sheet current position (F), according to the second aspect of the present invention. It diagrammatically show the crossing angle (θ) of the center line (cf) of the film sheet extending in the feeding direction of the film sheet 15 with respect to the first and the second fixed points (z1, z2) defined on the left and the right ends of the leading edge of the film sheet 15 at the film sheet current position (F) and the center control line (CO) indicating the direction along which both of the film sheet 15 and the rectangular panel W are to be conveyed.

FIGS. 12 and 13 assume a case where the film sheet current position (F) is not in coincidence with the film sheet control position (FO). For each film sheet 15 conveyed to the lamination position, the first fixed point (z1) and the second fixed point (z2) are defined respectively on the left and the right end of the leading edge extending in the transverse direction with respect to the feeding direction of the film sheet 15, and a third fixed point (z3) is defined on the center line (cf) at a position equidistant from the first and the second fixed points (z1, z2). A first longitudinal control point (x1) and a second longitudinal control point (x2) are defined on a transverse reference or control line (HO) perpendicular to the center control line (CO) as points corresponding to the first fixed point (z1) and the second fixed point (z2). There are also defined a first film sheet longitudinal reference or control line (FCO1) and a second film sheet longitudinal reference or control line (FCO2) corresponding respectively with the longer sides of the film sheet 15 and extending in parallel with the center control line (CO) to define the same width from the center control line (CO), a first transverse reference or control point (y1) and a second transverse reference or control point (y2) being defined on the first film sheet longitudinal control line (FCO1) and the second film sheet longitudinal control line (FCO2) as points corresponding to the first fixed point (z1) and the second fixed point (z2).

Reference is made to FIGS. 12 and 13. It is possible to measure the distance (s1) from the first longitudinal control point (x1) to the first fixed point (z1) and the distance (s2) from the second longitudinal control point (x2) to the second fixed point (z2), as well as the distance (t1) from the first transverse control point (y1) to the first fixed point (z1) and the distance (t2) from the second transverse control point (y2) to the second fixed point (z2) by taking images, for example, with two CCD cameras.

Figure 17:
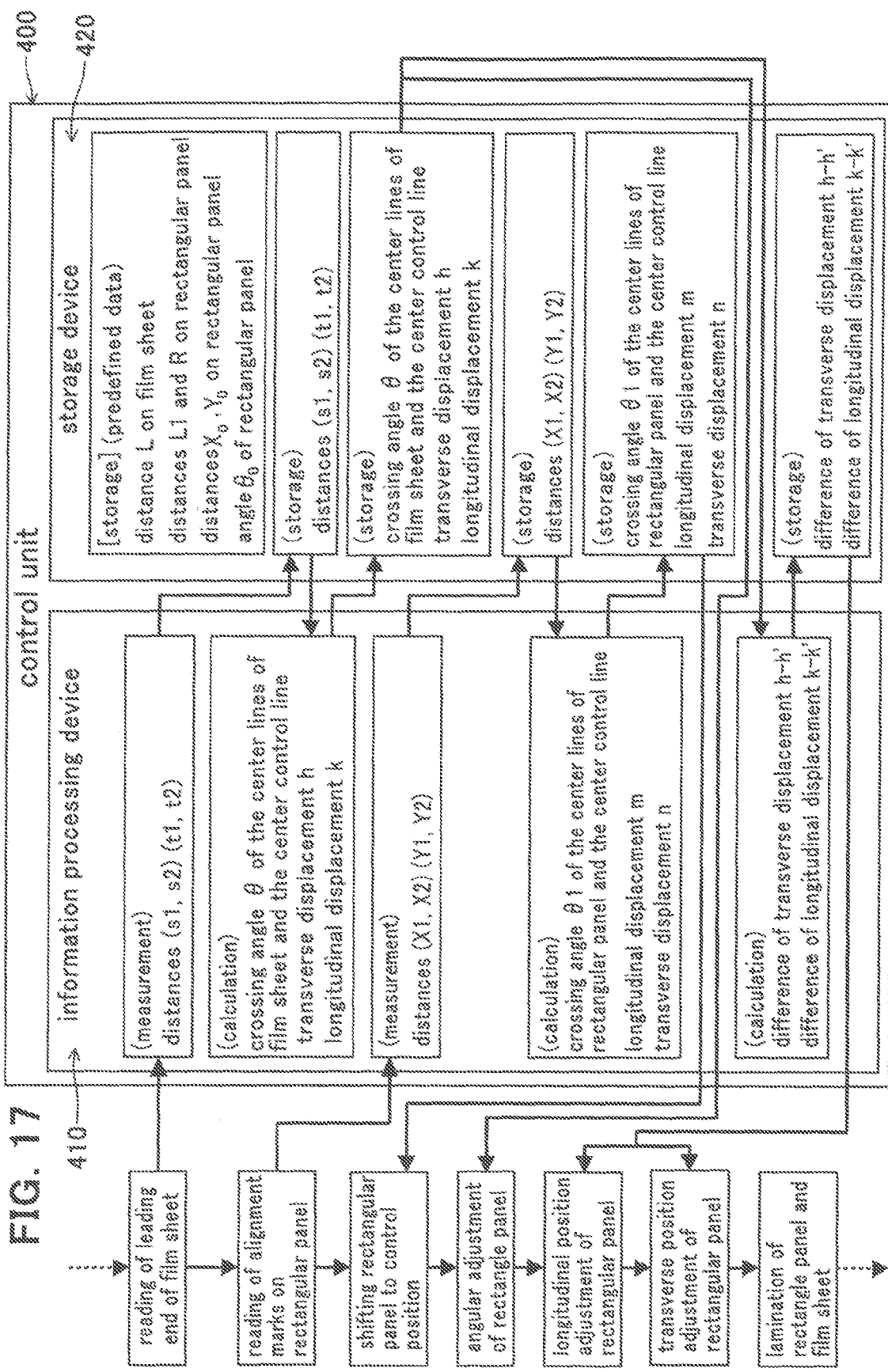
FIG. 17 is a flowchart showing the lamination process, including aligning, of the film sheet and the rectangular panel, according to the second embodiment of the present invention.

FIG. 17 is a flowchart showing the lamination process, including the aligning process, of the film sheet and the rectangular panel, according to the second aspect of the present invention. Referring to the flowchart, it is noted that the measured distances (s2, s2) and (t1, t2) are stored in the storage device 420 by the control unit 400. The storage device 420 also stores the value of the distance (L) between the first fixed point (z1) and the second fixed point (z2) as predefined data. The control unit 400 may cause the information processing device 410 to operate for calculating the following data based on the measured data (s1, s2) and the predefined stored data.

From the measured data and the stored data, calculation is conducted in accordance with the formula:

$$\tan \theta = (s1-s2)/L \quad (4)$$

where s1>s2.

The equation (4) allows for determining the crossing angle θ of the center line (cf) extending in the feeding direction of the film sheet 15 conveyed to the lamination position with respect to the center control line (CO), as shown in FIG. 12.

The displacement between the virtual film sheet 15 at the film sheet control position (FO) and the actual film sheet 15 at the film sheet present position (F) in the lamination position can be determined by the following equations (5) and (6).

The transverse displacement (h) shown in FIG. 13 is as follows. The first transverse control point (y1) and the second transverse control point (y2) respectively defined on the first film sheet longitudinal control line (FCO1) and the second film sheet longitudinal control line (FCO2) correspond respectively with the long sides of the film sheet 15 and extend in parallel with the center control line (CO) to define the same width from the center control line (CO), the points (y1) and (y2) being provided as points corresponding to the first fixed point (z1) and the second fixed point (z2). Then, the transverse displacement (h) can be represented as one-half of the difference between the distance (t1) from the first transverse control point (y1) to the first fixed point (z1) and the distance (t2) from the second transverse control point (y2) to the second fixed point (z2). Specifically, $$h = (t2-t1)/2 \quad (5)$$

where t2>t1

With the equation (5), the leading end (f) of the center line (cf) of the film sheet 15 actually conveyed to the lamination position is calculated as a position transversely displaced for the distance (h) from the leading end (cO) of the center line (cf) of the virtual film sheet 15 at the film sheet control position (FO).

The longitudinal displacement (k) shown in FIG. 13 is as follows. The first longitudinal control point (x1) and the second longitudinal control point (x2) on the transverse control line (HO) perpendicular to the center control line (CO) are points corresponding to the first fixed point (z1) and the second fixed point (z2). Thus, the longitudinal displacement (k) can be represented as one-half of the sum of the distance (s1) from the first longitudinal control point (x1) to the first fixed point (z1) and the distance (s2) from the second longitudinal control point (y2) to the second fixed point (z2). Then, $$k=(s1+s2)/2 \qquad (6)$$

is established.

With the equation (6), the leading end (f) of the center line (cf) of the film sheet 15 actually conveyed to the lamination position is calculated as a position longitudinally displaced for the distance (k) from the leading end (cO) of the center line (cf) of the virtual film sheet 15 at the film sheet control position (FO).

Figure 14:
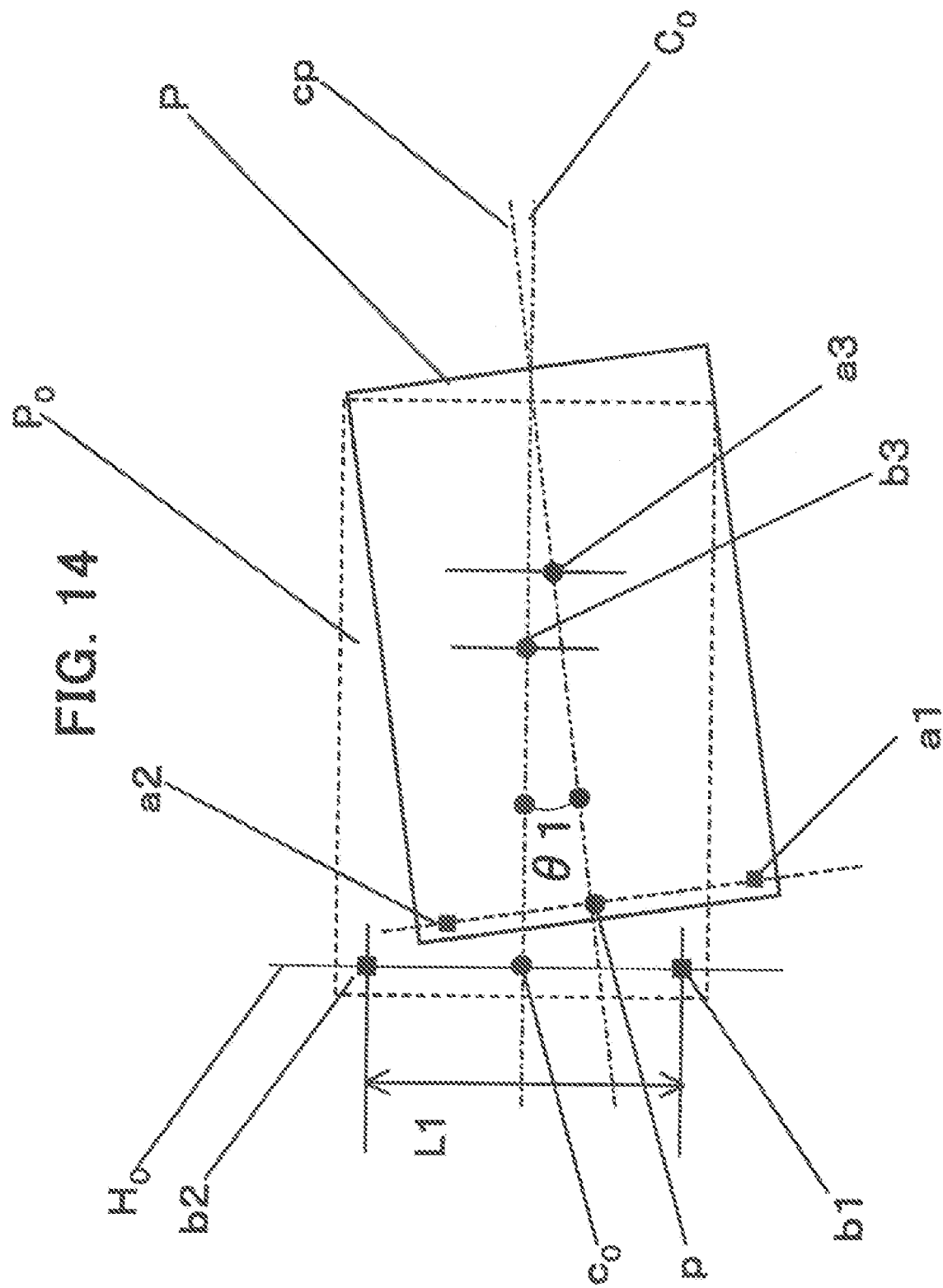
FIG. 14 is a schematic diagram illustrating the rectangular panel in the current position (P) with respect to the rectangular panel in the control position (PO), according to the second embodiment of the present invention.

FIG. 14 is a schematic diagram illustrating the rectangular panel current position (P) with respect to the rectangular panel control position (PO), according to the second aspect of the present invention. The rectangle shown by dotted lines is the rectangular panel control position (PO) for aligning the rectangular panel W on the center control line (CO) that indicates the direction along which both of the film sheet 15 and the rectangular panel W are to be conveyed. The rectangle shown by solid lines indicates the position that the rectangular panel W is actually conveyed to the lamination position and is the rectangular panel current position (P) with respect to the rectangular panel control position (PO).

The rectangular panel control position (PO) is pre-defined such that the center line (cf) extending in the feeding direction of the rectangular panel W conveyed to the lamination position coincides with the center control line (CO), the first and the second alignment marks (a1, a2) pre-defined on the left and right ends of the leading edge of the rectangular panel W coincide respectively with the first and second control points (b1, b2) on the transverse control line (HO) perpendicular to the center control line (CO), and the third alignment mark (a3) pre-defined at an equidistance from the first and the second alignment marks (a1, a2) coincides with the third control point (b3) on the center control line (CO).

Figure 15:
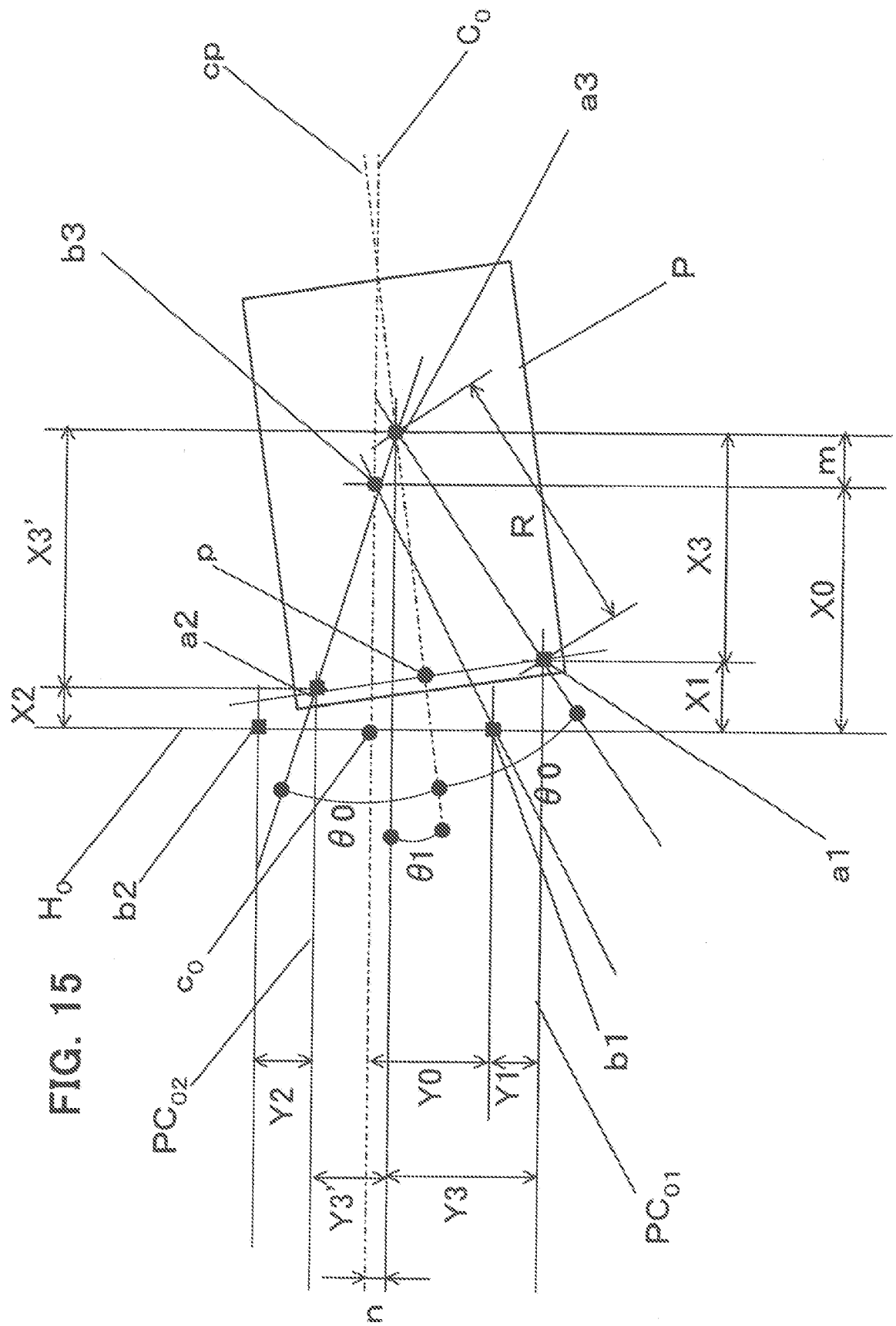
FIG. 15 is a schematic diagram illustrating the rectangular panel in the current position (P), according to the second embodiment of the present invention.

FIG. 15 is a schematic diagram illustrating the rectangular panel current position (P), according to the second aspect of the present invention. The position (P) shows the position of the rectangular panel W actually conveyed to the lamination position. As shown in FIG. 2, the first alignment mark (a1) and the second alignment mark (a2) are provided in advance on the left and right ends of the leading edge in the transverse direction with respect to the feeding direction of the rectangular panel W, and the third alignment mark (a3) is defined in advance at a position equidistant from the alignment marks on the center line (cp) extending in the feeding direction of the rectangular panel W. As apparent in FIG. 14, the first to the third alignment marks (a1, a2, a3) respectively correspond to the control points (b1, b2, b3) of the rectangular panel control position (PO). The crossing angle of the center line (cp) of the rectangular panel W with the center control line (CO) is represented as $\theta 1$.

FIGS. 14 and 15 illustrate cases where the rectangular panel current position (P) does not coincide with the rectangular panel control position (PO). The transverse control line (HO) perpendicular to the center control line (CO) may be preliminarily defined based on the first and second control points (b1, b2). Longitudinal distances to the transverse control line (HO) from the first and second alignment marks (a1, a2) of the rectangular panel W actually conveyed to the lamination position are shown by X1 and X2, respectively.

There are preliminarily defined a first and second panel longitudinal control lines (PCO1, PCO2) which extend in parallel with the center control line (CO) and pass through the first and second control point (b1, b2). Transverse distances from the first and the second alignment marks (a1, a2) to the first and the second panel longitudinal control line (PCO1, PCO2) are shown by Y1 and Y2, respectively.

The control unit 400 is able to measure the longitudinal distances (X1, X2) and the transverse distances (Y1, Y2) from the first and the second alignment marks (a1, a2) by taking images with, for example, two CCD cameras.

The following data shown in FIG. 15 are provided in advance, and are pre-stored in the storage device 420 by the control unit 400.

Data L1 is the distance between the first alignment mark (a1) and the second alignment mark (a2) of the rectangular panel W.

Data R is the distance between the third alignment mark (a3) pre-defined on the center line (cp) of the rectangular panel W and either one of the first alignment mark (a1) or the second alignment mark (a2).

In addition to the above, the pre-defined and pre-stored data may include a crossing angle $\theta 0$ between the center line (cp) extending in the feeding direction of the rectangular panel W and a line passing through the third alignment mark (a3) and either one of the first alignment mark (a1) or the second alignment mark (a2), a distance XO from the third control point (b3) to the transverse control line (HO), and a distance YO from the center control line (CO) to either one of the first control point (b1) or the second control point (b2).

Reference is now made to FIG. 17. It is noted that the measured distances (X1, X2) and (Y1, Y2) are stored in the storage device 420 by the control unit 400. In the storage device 420, there are stored in advance the distances L1 and R, the crossing angle $\theta 0$, and the distances XO and YO.

The control unit 400 functions to operate the information processing device 410, based on the above measured and stored data, to calculate the crossing angle $\theta 1$ between the center control line (CO) and the center line (cp) extending in the feeding direction of the rectangular panel W actually conveyed to the lamination position with the formula;

$$\tan \theta 1 = (X1-X2)/L1 \qquad (7)$$

where X1>X2.

The control unit 400 further functions to operate the information processing device 410, based on the calculated crossing angle $\theta 1$, to calculate the longitudinal distance (X3) from the third alignment mark (a3) to the first alignment mark (a1) shown in FIG. 15 with the formula;

$$X3 = \cos(\theta 0 + \theta 1) \times R \qquad (8),$$

or to calculate the longitudinal distance (X3') from the third alignment mark (a3) to the second alignment mark (a2) shown in FIG. 15 with the formula;

$$X3' = \cos(\theta 0 + \theta 1) \times R \qquad (8')$$

The control unit 400 similarly causes the information processing device 410 to operate, based on the calculated crossing angle $\theta 1$, to calculate the transverse distance (Y3) from the third alignment mark (a3) to the first alignment mark (a1) shown in FIG. 15 with the formula;

$$Y3 = \sin(\theta 0 + \theta 1) \times R \qquad (9),$$

or to calculate the transverse distance (Y3') from the third alignment mark (a3) to the second alignment mark (a2) shown in FIG. 15 with the formula;

$$Y3'=\sin(\theta 0+\theta 1)\times R \quad (9')$$

The control unit 400 further causes the information processing device 410 to operate, based on the calculated values (X3, X3'), to calculate the longitudinal displacement (m) from the third control point (b3) to the third alignment mark (a3) of the rectangular panel W actually conveyed to the lamination position shown in FIG. 15 with the formula;

$$m=X1+X3-XO \quad (10), \text{ or}$$

$$m=X2+X3'-XO \quad (10')$$

The control unit 400 similarly functions to operate the information processing device 410, based on the calculated values (Y3, Y3'), to calculate the transverse displacement (n) from the third control point (b3) to the third alignment mark (a3) of the rectangular panel W actually conveyed to the lamination position shown in FIG. 15 with the formula;

$$n=Y1+Y0-Y3 \quad (11), \text{ or}$$

$$n=Y2+Y3'-Y0 \quad (11')$$

Figure 16:
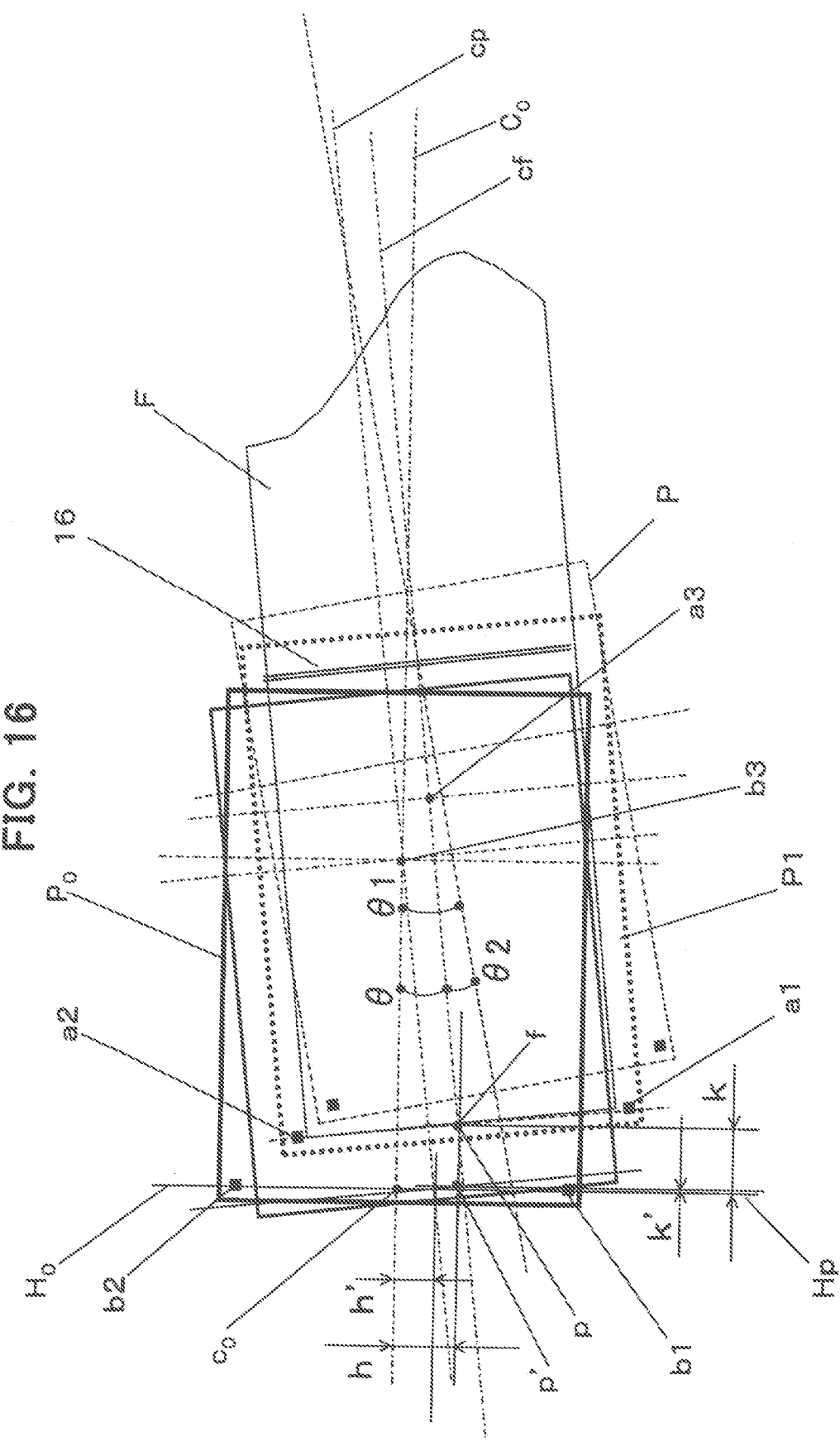
FIG. 16 is a schematic diagram illustrating a manner of positioning the rectangular panel which has been adjusted in position from the rectangular panel current position (P) to the rectangular panel control position (PO), to have it aligned with the film sheet current position (F), according to the second embodiment of the present invention.

FIG. 16 is a schematic diagram illustrating a manner of aligning the rectangular panel which has been adjusted in position from the rectangular panel current position (P) to the rectangular panel control position (PO), with the film sheet present position (F), according to the second aspect of the present invention. More specifically, the rectangle shown by thin dotted lines in FIG. 16 represents the rectangular panel current position (P) of the rectangular panel W actually conveyed to the lamination position. The rectangle shown by thick solid lines represents the rectangular panel W which has been adjusted in position to the rectangular panel control position (PO). A series of rectangles shown by thin solid lines designate the film sheets 15 segmented by the slit lines 16 and actually conveyed to the lamination position at the current position (F) of the film sheets 15. The rectangle shown by thick dotted lines represents the rectangular panel corrected position (P1) of the rectangular panel W which has been subjected to re-adjustment after the rectangular panel W has been adjusted to the rectangular panel control position (PO). The second aspect of the present invention is described in detail in the followings.

FIG. 16 assumes a case where both of the film sheet 15 actually conveyed to the lamination position and the rectangular panel W conveyed to the lamination position in synchronized relation with the film sheet 15 are partly laid one over the other but displaced respectively from the film sheet control position (FO) and the rectangular panel control position (PO). The film sheet 15 and the rectangular panel W actually conveyed to the lamination position are aligned through the following steps to provide the display panel shown in FIG. 2.

The control unit 400 causes the alignment table 321 of the alignment unit 320 loaded with the rectangular panel W to rotate about the third alignment mark (a3), for example, for the crossing angle θ1 of the center line (cp) extending in the feeding direction of the rectangular panel W with respect to the center control line (CO). With this operation, the rectangular panel W is angularly adjusted such that the center line (cp) of the rectangular panel W extends in parallel with the center control line (CO).

The rectangular panel W angularly adjusted as above is then adjusted in position for the amounts of the longitudinal and the transverse displacements from the rectangular panel control position (PO), i.e., for the amounts of the longitudinal displacement (m) and the transverse displacement (n) between the third control point (b3) and the third alignment mark (a3). With this adjustment, the position of the angularly adjusted rectangular panel W is temporarily adjusted to the rectangular panel control position (PO).

The control unit 400 causes the alignment table 321 of the alignment unit 320 to rotate about the third control point (b3) with the rectangular panel W which has been adjusted in position to the rectangular panel control position (PO), for example, by an angle corresponding to the crossing angle θ of the center line (cf) of the film sheet 15 conveyed to the lamination position with respect to the center control line (CO). With this operation, the rectangular panel W is angularly adjusted such that the center line (cp) of the rectangular panel W extends in parallel with the center line (cf) of the film sheet 15.

Reference is further made to FIG. 16. It should be noted that the coordinates (k, h) indicate the leading end position (f) of the center line (cf) of the film sheet 15 at the film sheet present position (F). They also represent the longitudinal and transverse displacements of the leading end position (f) from the leading end position (cO) of the center line (cf) of the film sheet 15 at the film sheet control position (FO). The position (cO) which is the leading end position of the center line (cf) of the film sheet 15 at the film sheet control position (FO) also coincides with the leading end position (p) of the center line of the rectangular panel W at the rectangular panel control position (PO). Thus, the rectangular panel W is angularly adjusted by an angle corresponding to the crossing angle θ about the third control point (b3) which is in coincidence with the third alignment mark (a3) of the rectangular panel W which has been adjusted in position to the rectangular panel control position (PO), whereby the center line (cp) of the rectangular panel W is positioned to extend in parallel with the center line (cf) of the film sheet 15. The leading end (p') of the center line (cp) of the rectangular panel W in this instance is on the coordinates (k', h') which can be calculated based on the distance from the third control point (b3) to the (cO) corresponding to the leading end position (p) of the center line of the rectangular panel W at the rectangular panel control position (PO), i.e., the R1 (=R×cos θ0) and the crossing angle θ of the center line (cf) of the film sheet 15 with respect to the center control line (CO). Then, the angularly adjusted rectangular panel W has to be shifted longitudinally and transversely for the amounts corresponding to values (k-k', h-h') representing the deviations between the leading end position of the center line (cf) of the film sheet 15 and the leading end position (p') of the center line (cp) of the rectangular panel W. Thus, the angularly adjusted rectangular panel W can be placed over the film sheet 15 actually conveyed to the lamination position.

It is needless to mention that the aligning procedure shown in FIG. 2(B) or 2(C) using the film sheet 15 which leaves non-overlapping marginal edges around the rectangular panel W after the lamination can be conducted by adjusting the transverse displacement (h).

The second aspect of the present invention will now be described with referring to the flowchart of FIG. 4.

In step 7, the film sheet 15 is peeled off the carrier film 14, and in step 8, the leading edge of the film sheet 15 is detected. Then, calculation is conducted to obtain the crossing angle θ of the center line (cf) extending in the feeding direction of the film sheet 15 with respect to the center control line (CO) indicating the direction along which both the film sheet 15 and the rectangular panel W are to be conveyed.

Then, the distance (s1) from the first longitudinal control point (x1) to the first fixed point (z1) and the distance (s2) from the second longitudinal control point (x2) to the second fixed point (z2), and, the distance (t1) from the first transverse control point (y1) to the first fixed point (z1) and the distance (t2) from the second transverse control point (y2) to the second fixed point (z2) are measured.

The control unit 400 functions to store the above data in the storage device 420. The control unit 400 then causes the information processing device 410 to operate, based on the data, to calculate longitudinal and transverse displacements (k, h) of the leading end position (f) of the center line (cf) of the film sheet 15 actually conveyed to the lamination position from the leading end position (cO) of the virtual film sheet 15 at the film sheet control position (FO).

Meanwhile, in step 11, the first to the third alignment marks (a1, a2, a3) of the rectangular panel W conveyed to the lamination position in synchronization with the film sheet 15 are read, and thereby the distances (X1, X2) from the first and the second alignment marks (a1, a2) to the transverse control line (HO) and the distances (Y1, Y2) from the first and the second alignment marks (a1, a2) to the first and the second panel longitudinal control lines (PCO1, PCO2) are measured. Then, the crossing angle θ1 of the center line (cp) of the rectangular panel W conveyed to the lamination position with respect to the center control line (CO) is calculated. The control unit 400 functions to store the above data in the storage device 420.

Based on the above measurement data and the preliminarily prepared data, calculation is conducted to obtain the longitudinal and transverse displacements (m, n) of the rectangular panel W actually conveyed to the lamination position from the rectangular panel control position (PO).

In step 12, the control unit 400 temporarily adjust the actual position of the rectangular panel W to the rectangular panel control position (PO) based on the calculated data (m, n). Then, in step 13, the control unit 400 causes the rectangular panel W which has been temporarily adjusted in position to the rectangular panel control position (PO) to rotate, for example, by an angle corresponding to the crossing angle θ of the center line (cf) of the film sheet 15 with respect to the center control line (CO), about the third alignment mark (a3), i.e., the third control point (b3). The coordinates (k', h') of the leading end position (p') of the center line (cp) of the angularly adjusted rectangular panel W is then calculated. Subsequently, the angularly adjusted rectangular panel W is adjusted in position by distances corresponding to the displacements (k-k', h-h') respectively corresponding to the differences of the longitudinal and the transverse displacement (k, h) between the actual position of the film sheet 15 and the film sheet control position (FO). With this adjustment, the rectangular panel W is aligned with the film sheet 15 to be laminated in steps 14 and 15.

Figure 18:
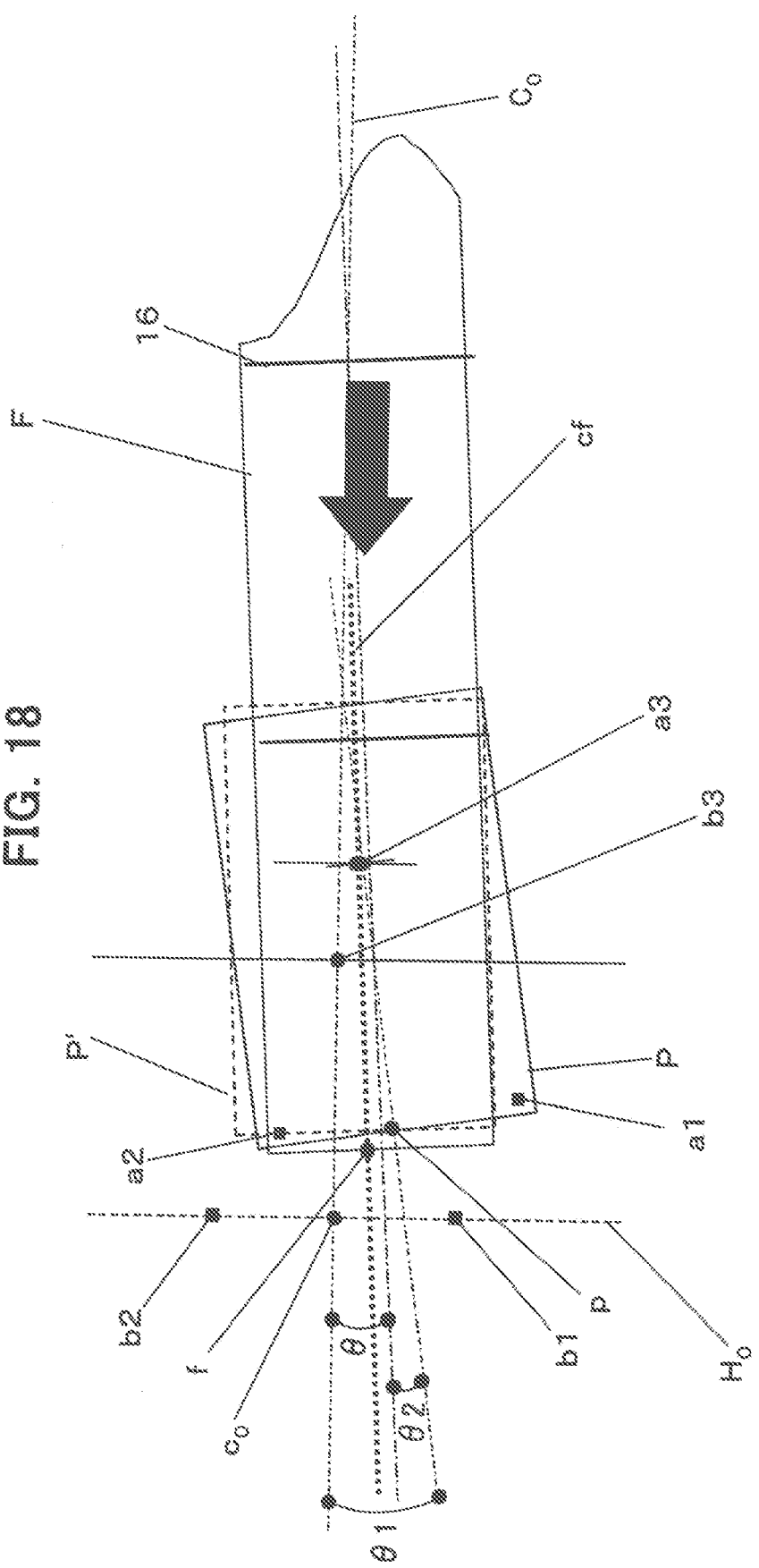
FIG. 18 is a schematic diagram illustrating a manner of angle adjustment of the center line of the rectangular panel for aligning the panel to the film sheet in the current position (F), according to the third embodiment of the present invention.

FIGS. 18 to 20 are schematic diagrams for explaining a third aspect of the present invention. The detailed explanation of the third aspect of the present invention in the following will be provided in comparison with the second aspect, and an explanation for a redundant part will be simplified.

FIG. 18 is a schematic diagram illustrating an angular adjustment of the center line of the rectangular panel for aligning it with the film sheet current position (F), according to the third aspect of the present invention. The film sheet 15 actually conveyed to the lamination position is in the film sheet current position (F) where the center line (cf) of the film sheet 15 intersects the center control line (CO) with a crossing angle θ. On the other hand, the rectangular panel W actually conveyed to the lamination position is on the rectangle shown by thick solid lines at the rectangular panel current position (P) where the center line (cp) of the rectangular panel W intersects the center control line (CO) with a crossing angle θ1.

In the case where the respective crossing angles (θ, θ1) of the center lines (cf, cp) of the film sheet 15 and the rectangular panel W with respect to the center control line (CO) are equal, i.e., if θ=θ1, it can be determined that the center lines are parallel to each other. In such a case, simple adjustment in positions of the leading ends (f, p) of the center lines extending in the feeding direction will result in an alignment of the film sheet 15 and the rectangular panel W. FIG. 18 assumes, however, a case where θ≠θ1. An angle θ2 represents a difference between the angles θ1 and θ (θ2=θ1-θ, where θ1>θ). For example, the control unit 400 causes rotation about the third alignment mark (a3) of the rectangular panel W loaded on the alignment table 321, shown in FIG. 6, for an angle corresponding to the angle θ2 which is the difference between the angles θ1 and θ with respect to the center line (cp) of the rectangular panel W, to have the center line (cp) of the rectangular panel W extended in parallel with the center line (cf) of the film sheet 15. The third aspect of the present invention is characterized in that it comprises a step of aligning the center line (cp) of the rectangular panel W in parallel or in coincidence with the center line (cf) of the film sheet 15 without the step of temporarily shifting the rectangular panel W to the rectangular panel control position (PO).

Reference is made to FIG. 20 which is a flowchart showing the lamination process, including the aligning procedure, of the film sheet and the rectangular panel, according to the third aspect of the present invention. The distances (s1, s2) and (t1, t2) measured by detecting the leading end of the film sheet 15 are stored in the storage device 420 under the control of the control unit 400. As shown in the flowchart of FIG. 17, the storage device has the preliminarily prepared data, and the control unit 400 causes the information processing device 410 to operate to perform a calculation, based on the measured and the preliminarily prepared data, for obtaining the crossing angle θ of the center line (cf) of the film sheet 15 actually conveyed to the lamination position with respect to the center control line (CO), and the longitudinal and transverse displacements (k, h) of the leading end (f) of the center line (cf) of the film sheet 15 at the film sheet present position (F) from the leading end (cO) of the center line (cf) of the film sheet 15 at the film sheet control position (FO), in accordance with the above equations (4), (5) and (6).

Meanwhile, the longitudinal and transverse displacements (X1, X2) and (Y1, Y2) of the rectangular panel W at the rectangular panel current position (P) measured by detecting the first to the third alignment marks (a1, a2, a3) of the rectangular panel W actually conveyed to the lamination position are stored in the storage device 420. The control unit 400 causes the information processing device 410 to operate to perform a calculation, based on the measured and the pre-prepared data, the crossing angle θ1 of the center line (cp) of the rectangular panel W with respect to the center control line (CO), and the longitudinal and transverse displacements (m, n) of the leading end (p) of the center line (cp) of the rectangular panel W at the rectangular panel present position (P) from the leading end (cO) of the center line (cp) of the rectangular panel W at the rectangular panel control position (PO), in accordance with the above equations (7) to (11).

FIG. 19 is a schematic diagram illustrating a manner of shifting an angularly adjusted rectangular panel position (P') in the longitudinal and transverse directions by distances corresponding to the displacements (m, n) of the rectangular panel from the film sheet current position (F) to align the rectangular panel actually conveyed to the lamination position in synchronization with the film sheet present position with the film sheet current position (F), according to the third aspect of the present invention.

Referring to FIG. 18, it is noted that the rectangular panel W is rotated about the third alignment mark (a3) for an angle corresponding to the difference (θ2) between the crossing angle of the center line (cf) of the film sheet 15 with respect to the center control line (CO) and the crossing angle of the center line (cp) of the rectangular panel W with respect to the center control line (CO), the difference being calculated in accordance with the formula;

$$\theta 2 = \theta 1 - \theta \quad (12)$$

where θ1>θ.

With this procedure, the center line (cp) of the rectangular panel W is angularly adjusted to a position parallel with the center line (cf) of the film sheet 15. This is the angularly adjusted rectangular panel position (P').

The rectangular panel W at the angularly adjusted rectangular panel position (P') is then shifted in the longitudinal direction by a distance corresponding to the difference (m1) between the longitudinal displacements (k) and (m), the displacement (k) being the longitudinal displacement of the leading end (f) of the film sheet 15 in the film sheet current position (F) from the film sheet control position (FO) and the displacement (m) being the longitudinal displacement of the third alignment mark (a3) from the third control point (b3), the difference (m1) being calculated in accordance with the formula;

$$m1 = k - m \quad (13)$$

where k>m.

Subsequently, the rectangular panel W is shifted in the transverse direction by a distance corresponding to the difference (n1) between the transverse displacements (h) and (n), the displacement (h) being the transverse displacement of the leading end (f) of the film sheet 15 in the film sheet current position (F) from the film sheet control position (FO) and the displacement (n) being the longitudinal displacement of the third alignment mark (a3) from the third control point (b3), the difference (n1) being calculated in accordance with the formula;

$$n1 = h - n \quad (14)$$

where h>n.

With these procedures, the rectangular panel W is adjusted in position such that the rectangular panel W, conveyed to the lamination position in synchronization with the film sheet 15, is completely laid over the film sheet 15, or, is laid with marginal edges of constant widths left on four sides of the rectangular panel W.

The first to the third aspects of the present invention are characterized in that the rectangular panel W is angularly adjusted to the film sheet 15 such that the center line (cp) extending in the feeding direction of the rectangular panel W conveyed to the lamination position in synchronization with the film sheet 15 extends in parallel or in coincidence with the center line (cf) extending in the feeding direction of the film sheet 15 conveyed to the lamination position, and the rectangular panel W is adjusted in position to the film sheet 15 such that the leading end (p) of the center line of the angularly adjusted rectangular panel W is laid over the leading end (f) of the film sheet 15, to have the film sheet 15 and the rectangular panel W aligned when conveyed to the lamination position. The second aspect of the present invention allows for a higher aligning accuracy. The third aspect of the present invention allows for a higher aligning speed.

The invention claimed is:

1. A method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner;

the method comprising steps of;

angularly adjusting the rectangular panel conveyed to the lamination position such that the center line extending in the feeding direction of the rectangular panels is in parallel with the center line extending in the feeding direction of the film sheets conveyed to the lamination position; and positionally adjusting the angularly adjusted rectangular panels by shifting each of the panels by a distance corresponding to a displacement of each panel from the position of the corresponding film sheet conveyed to the lamination position.

2. The method in accordance with claim 1 including a step of positionally adjusting the rectangular panel conveyed to the lamination position such that the center line of the rectangular panel is transversely aligned with the center line of the film sheet conveyed to the lamination position, whereby the rectangular panel conveyed to the lamination position is laid over the film sheets conveyed to the lamination position with marginal edge portions of a predetermined width left to extend along the feed direction and/or along the transverse direction.

3. The method in accordance with claim 1 including a step of positionally adjusting the rectangular panel conveyed to the lamination position such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

4. A method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner;

the method comprising steps of;

(1) determining an amount of displacement of the position of the film sheet conveyed to the lamination position from a film sheet reference position, said film sheet reference position being determined in advance at the lamination position for positioning the film sheet when the film sheet is located on a center reference line indicating a direction along which the film sheets and the rectangular panels are to be conveyed;

(2) determining an angle of the center line extending in the feeding direction of the film sheet conveyed to the lamination position with respect to the center reference line;

(3) determining an amount of displacement of the position of the rectangular panel conveyed to the lamination position from a rectangular panel reference position, said rectangular panel reference position being also determined in advance at the lamination position for positioning the rectangular panel when the rectangular panel is positioned on the center reference line;

(4) determining an angle of the center line extending in a feeding direction of the rectangular panel conveyed to the lamination position with respect to the center reference line;

(5) angularly adjusting the rectangular panel conveyed to the lamination position such that the center line of the rectangular panel is oriented in parallel with the center reference line;

(6) shifting the angularly adjusted rectangular panel by a distance corresponding to the amount of the displacement from the rectangular panel reference position;

(7) further angularly adjusting the rectangular panel of which position is corrected to the rectangular panel reference position, such that the center line of the rectangular panel is oriented in parallel with the center line of the film sheet conveyed to the lamination position; and (8) shifting the further angularly adjusted rectangular panel by a distance corresponding to the amount of the displacement of the position of the film sheet conveyed to the lamination position from the film sheet reference position.

5. The method in accordance with claim 4 including a step of positionally adjusting the rectangular panel, conveyed to the lamination position such that the center line of the rectangular panel is transversely aligned with the center line of the film sheet conveyed to the lamination position, whereby the rectangular panel conveyed to the lamination position is laid over the film sheet conveyed to the lamination position with marginal edge portions of a predetermined width left to extend along the feed direction and/or along the transverse direction.

6. The method in accordance with claim 4 including a step of positionally adjusting the rectangular panel conveyed to the lamination position such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

7. A method for aligning film sheets and rectangular panels in a continuous manufacturing system of display panels, the manufacturing system being configured for providing film sheets each formed in a strip shaped film laminate between two longitudinally adjacent, transversely extending slit lines, one being at an upstream side and the other at a downstream side as seen in a feed direction of the film laminate, and conveying the film sheets as an integral unit with the strip shaped film laminate, with respect to a plurality of sequentially conveyed rectangular panels, to a lamination position for lamination with the rectangular panels, peeling the film sheets from the strip shaped film laminate, and laminating the peeled sheets with the rectangular panels conveyed to the lamination position in synchronization with the film sheets to thereby produce display panels in a continuous manner;

the method comprising steps of:

(1) determining an amount of displacement of the position of the film sheet conveyed to the lamination position from a film sheet reference position, said film sheet reference position being determined in advance at the lamination position for positioning the film sheet when the film sheet is located on a center reference line indicating a direction along which the film sheets and the rectangular panels are to be conveyed;

(2) determining an angle of the center line extending in the feeding direction of the film sheet conveyed to the lamination position with respect to the center reference line;

(3) determining an amount of displacement of the position of the rectangular panel conveyed to the lamination position from a rectangular panel reference position, said rectangular panel reference position being also determined in advance at the lamination position for positioning the rectangular panel when the rectangular panel is positioned on the center reference line;

(4) determining an angle of the center line extending in a feeding direction of the rectangular panel conveyed to the lamination position with respect to the center reference line;

(5) angularly adjusting the rectangular panel conveyed to the lamination position based on the angles determined in the steps (2) and (4) such that the center line of the rectangular panel is oriented in parallel with the center reference line;

(6) then shifting the angularly adjusted rectangular panel based on the amounts of displacements determined in the steps (1) and (3) by a distance corresponding to the amounts of the displacements from the position of the film sheet conveyed to the lamination position whereby the rectangular panel conveyed to the lamination position is laid over the film sheet conveyed to the lamination position.

8. The method in accordance with claim 7 including a step of positionally adjusting the rectangular panel, conveyed to the lamination position such that the center line of the rectangular panel is transversely aligned with the center line of the film sheet conveyed to the lamination position, whereby the rectangular panel conveyed to the lamination position is laid over the film sheet conveyed to the lamination position with marginal edge portions of a predetermined width left to extend along the feed direction and/or along the transverse direction.

9. The method in accordance with claim 7 including a step of positionally adjusting the rectangular panel conveyed to the lamination position such that such that a distance is left between the center line of the rectangular panel conveyed to the lamination position and the center line of the film sheets conveyed to the lamination position whereby the rectangular panel conveyed to the lamination position is laid over the film sheet conveyed to the lamination position with marginal edge portions of a predetermined width left to extend along the feed direction and/or along the transverse direction.

\* \* \* \* \*